March 11, 1958  C. S. PRICE  2,826,022
APPLICATION OF WRAPS AND/OR STRIP STAMPS
TO THE NECKS OF BOTTLES
Filed May 23, 1956  12 Sheets-Sheet 1
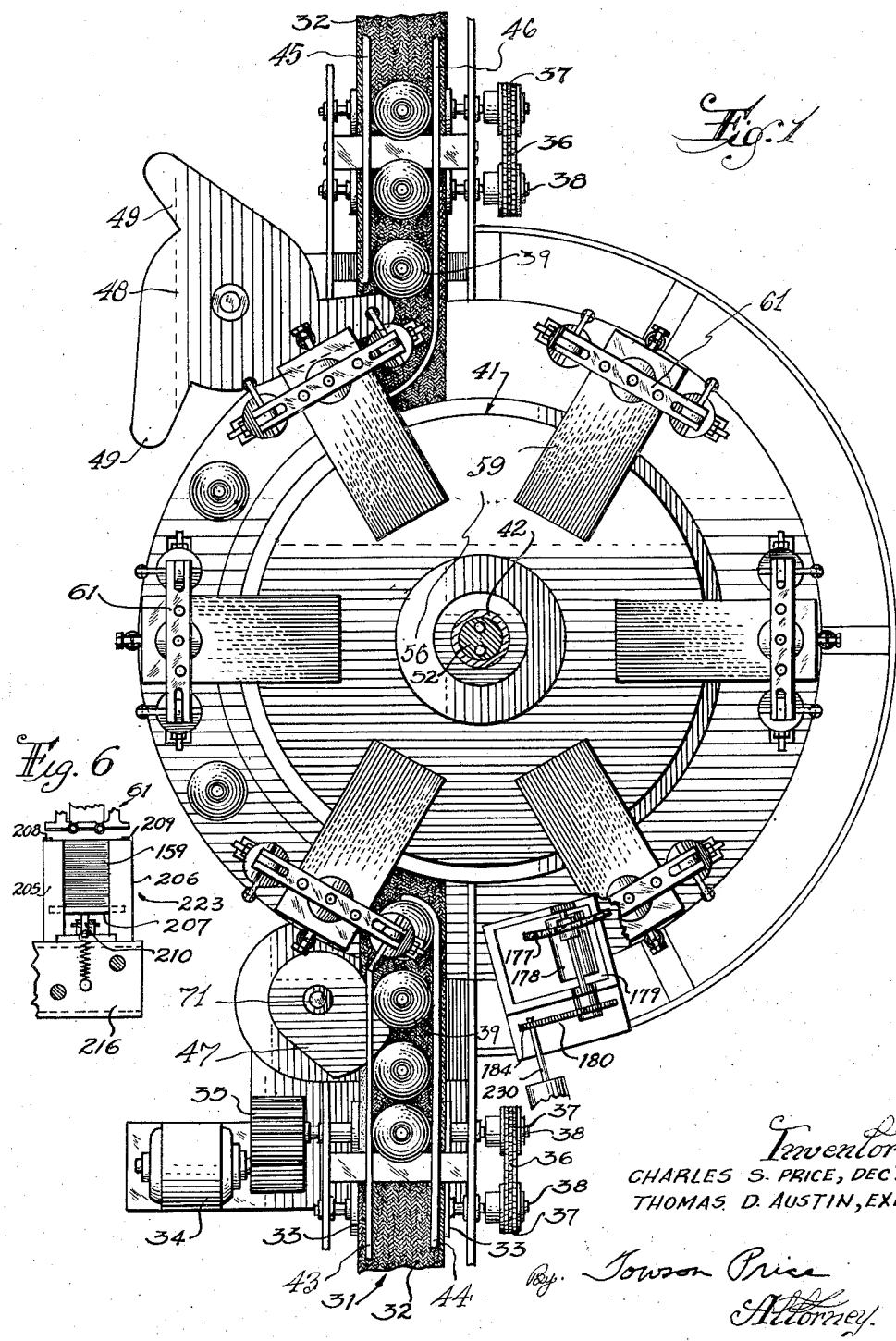
Inventor:
CHARLES S. PRICE, DEC'D.
THOMAS D. AUSTIN, EXEC.
By Towson Price
Attorney.

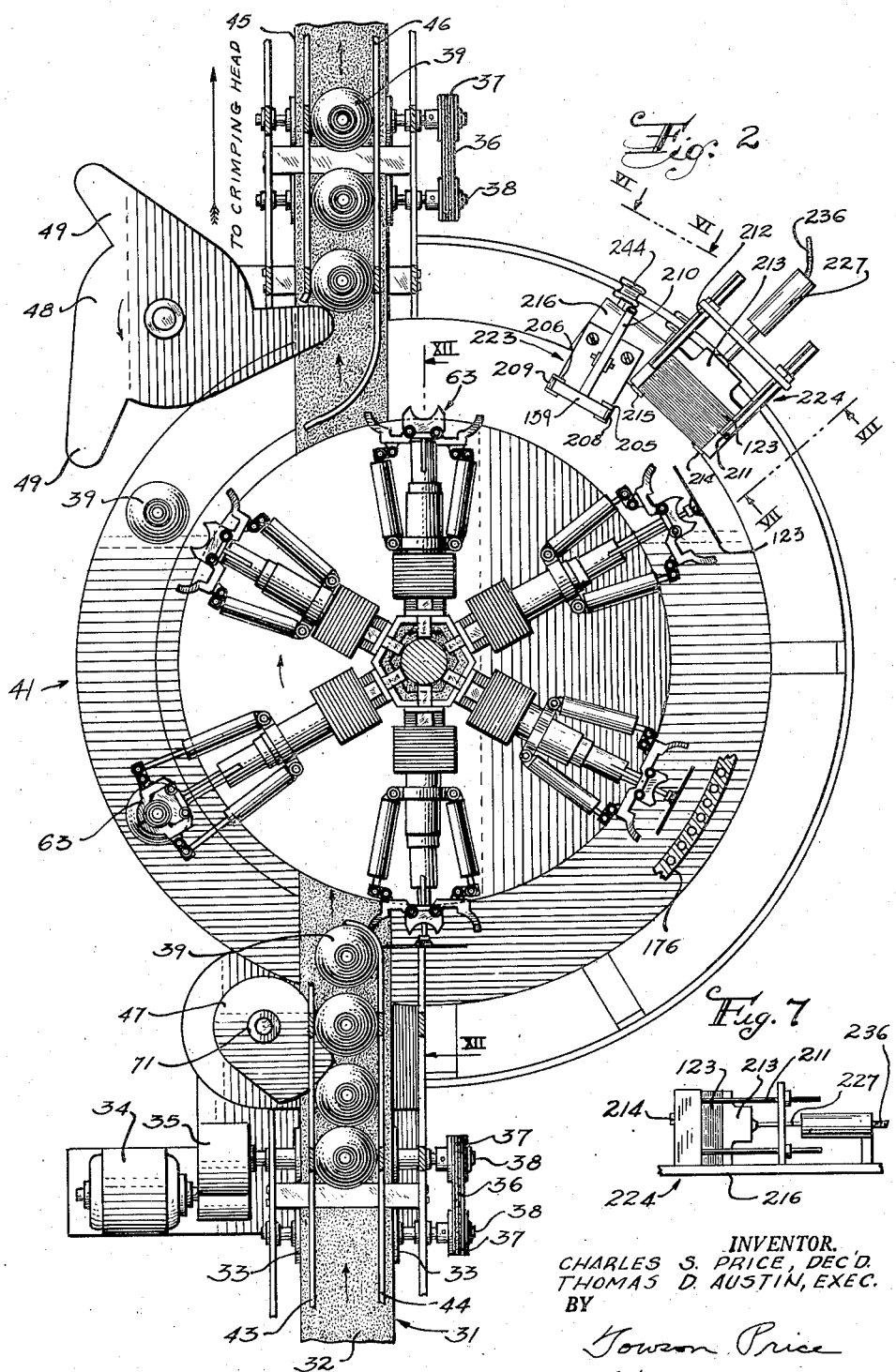

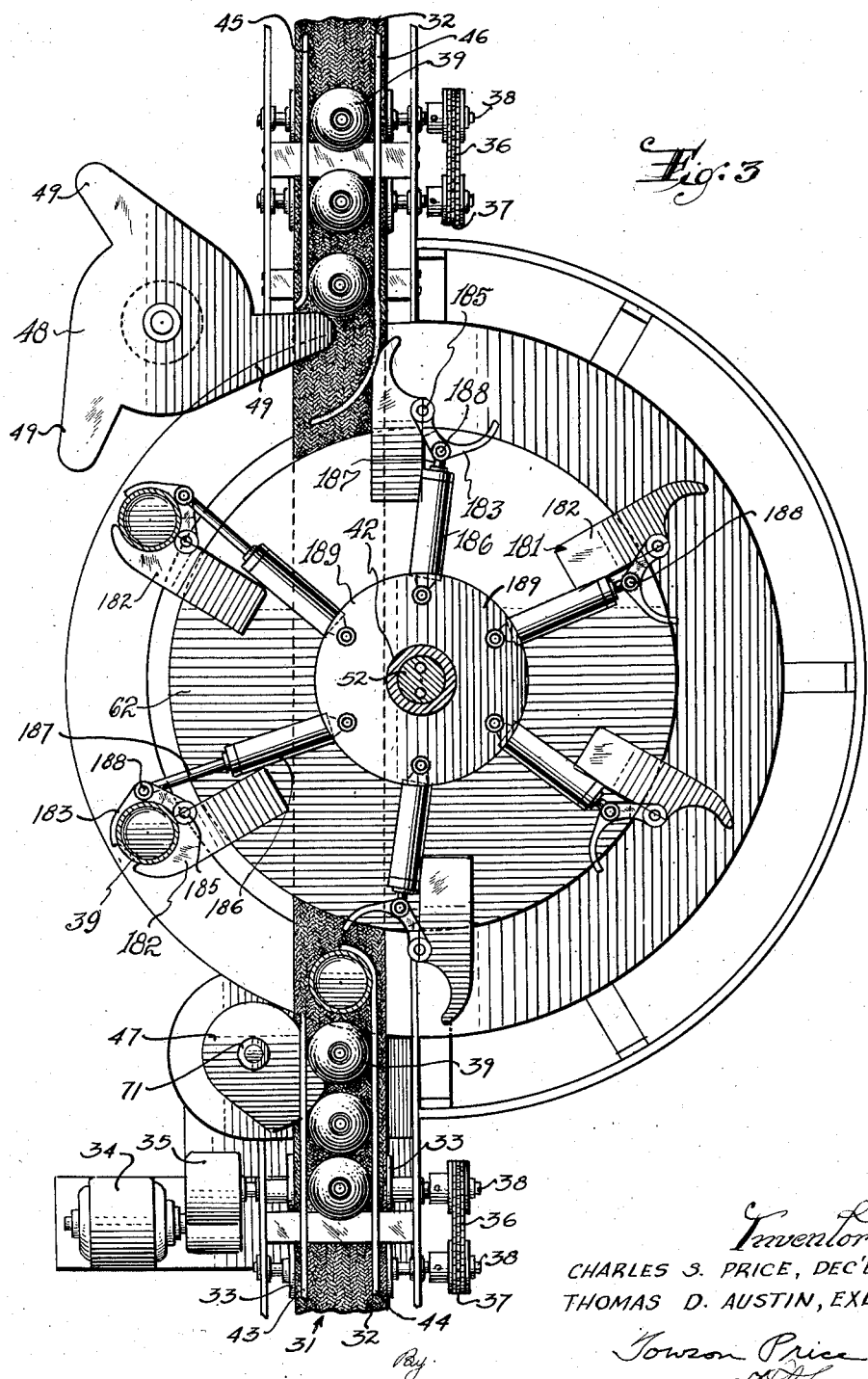

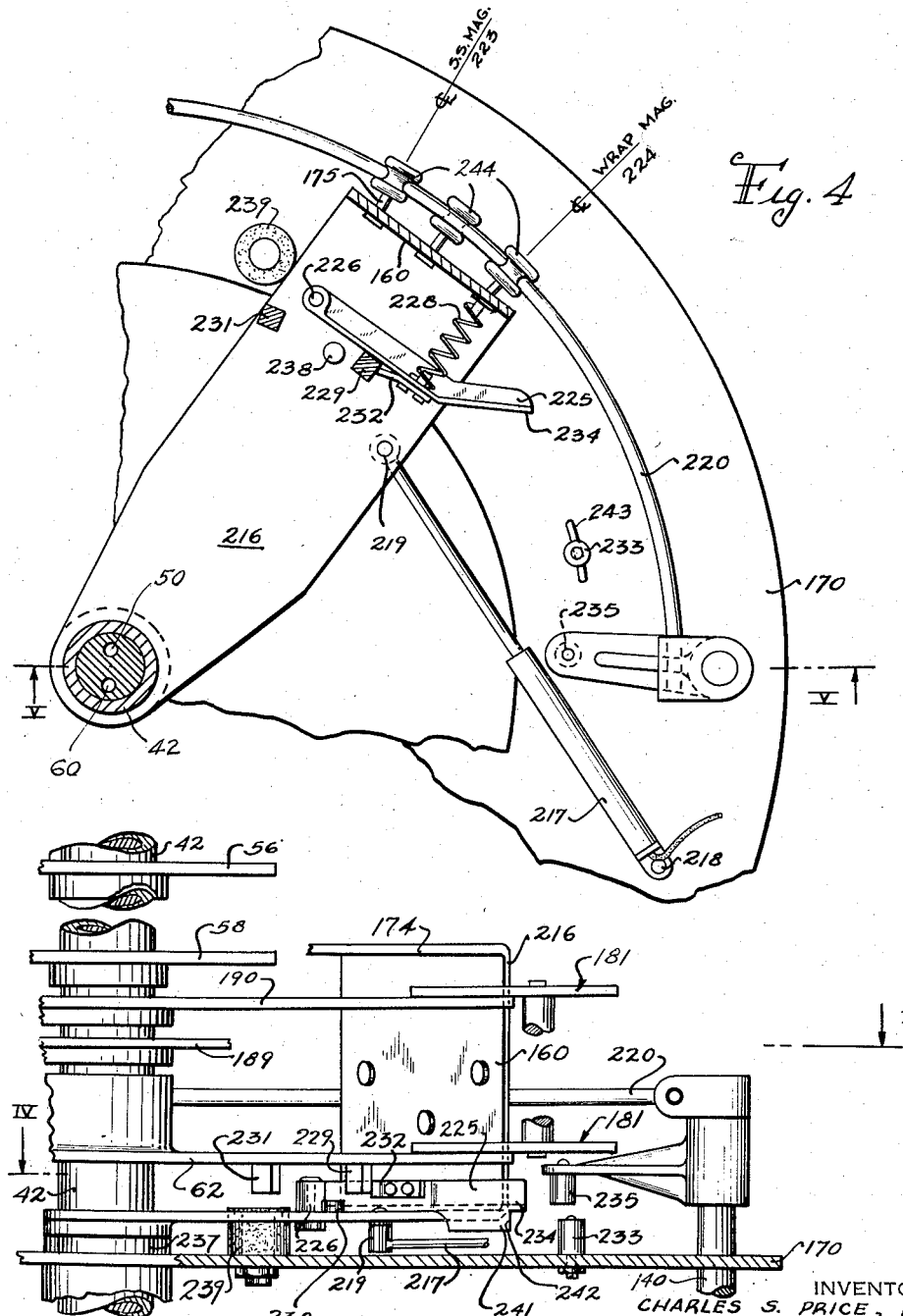

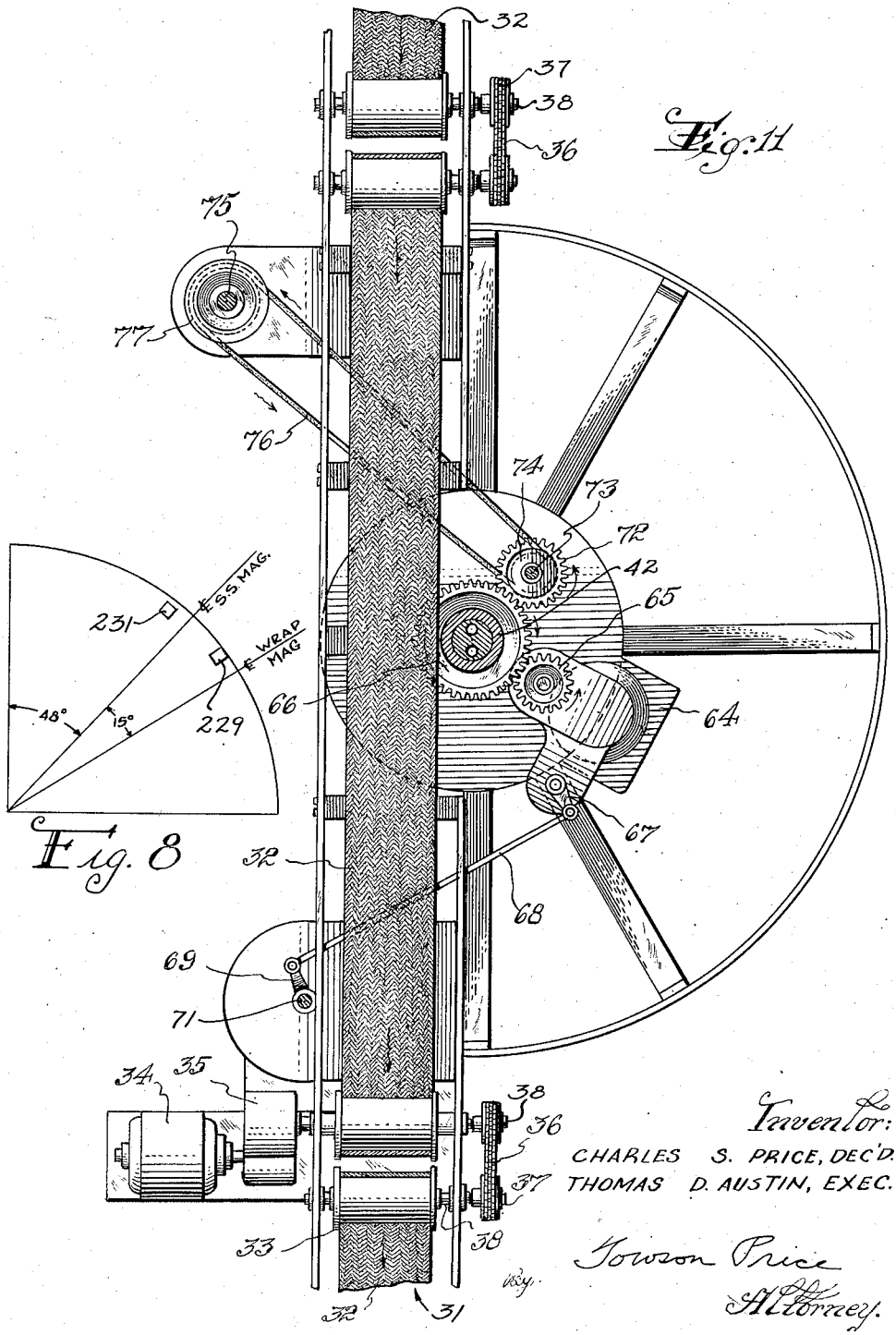

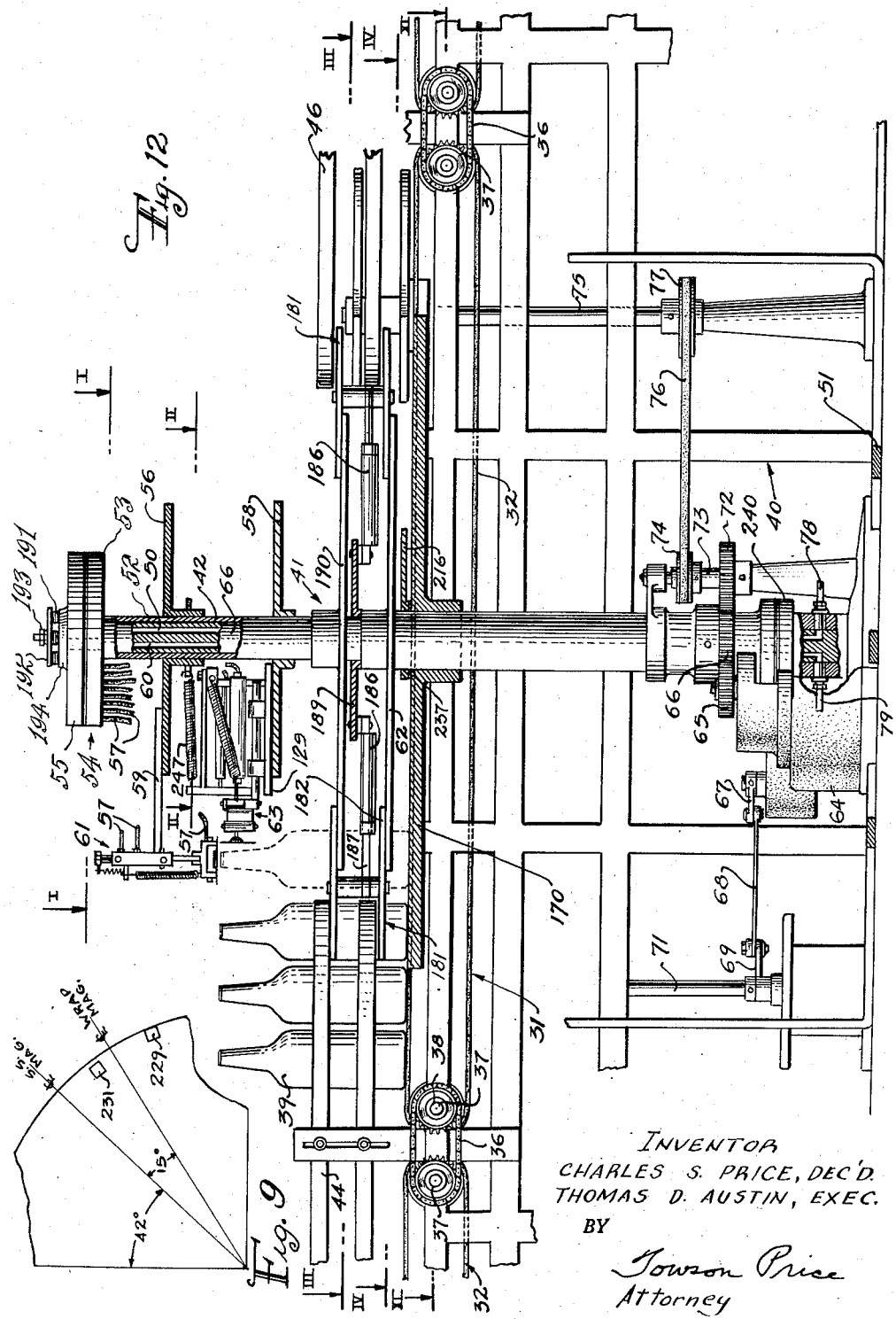

March 11, 1958
C. S. PRICE
2,826,022
APPLICATION OF WRAPS AND/OR STRIP STAMPS
TO THE NECKS OF BOTTLES
Filed May 23, 1956
12 Sheets-Sheet 7
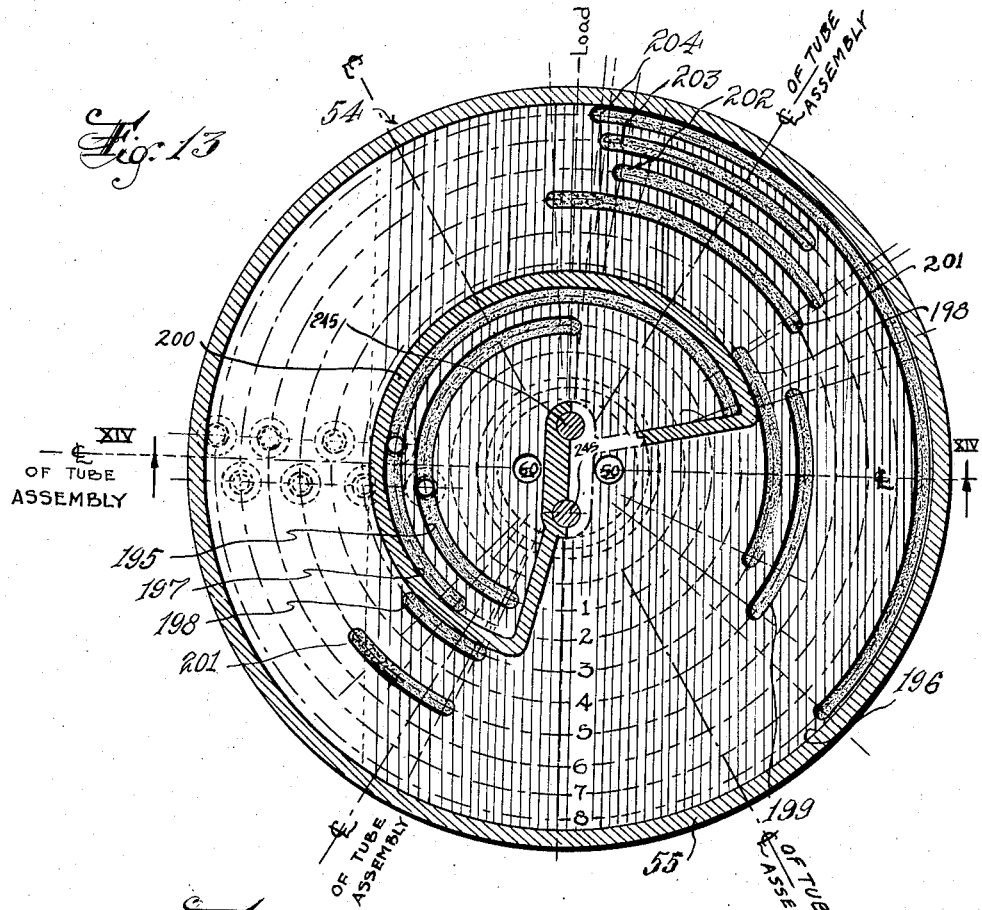
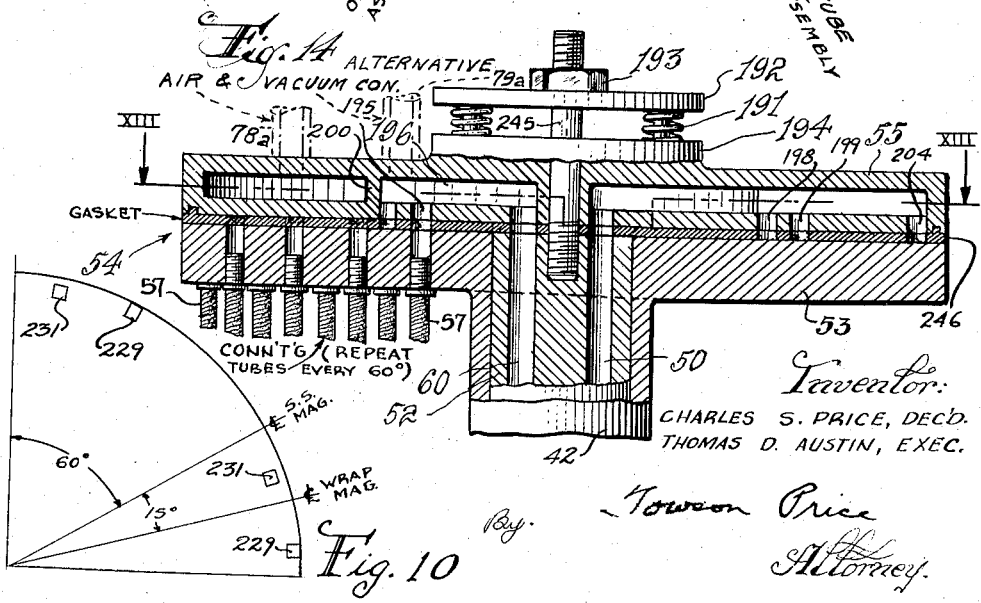
Inventor:
CHARLES S. PRICE, DEC'D.
THOMAS D. AUSTIN, EXEC.

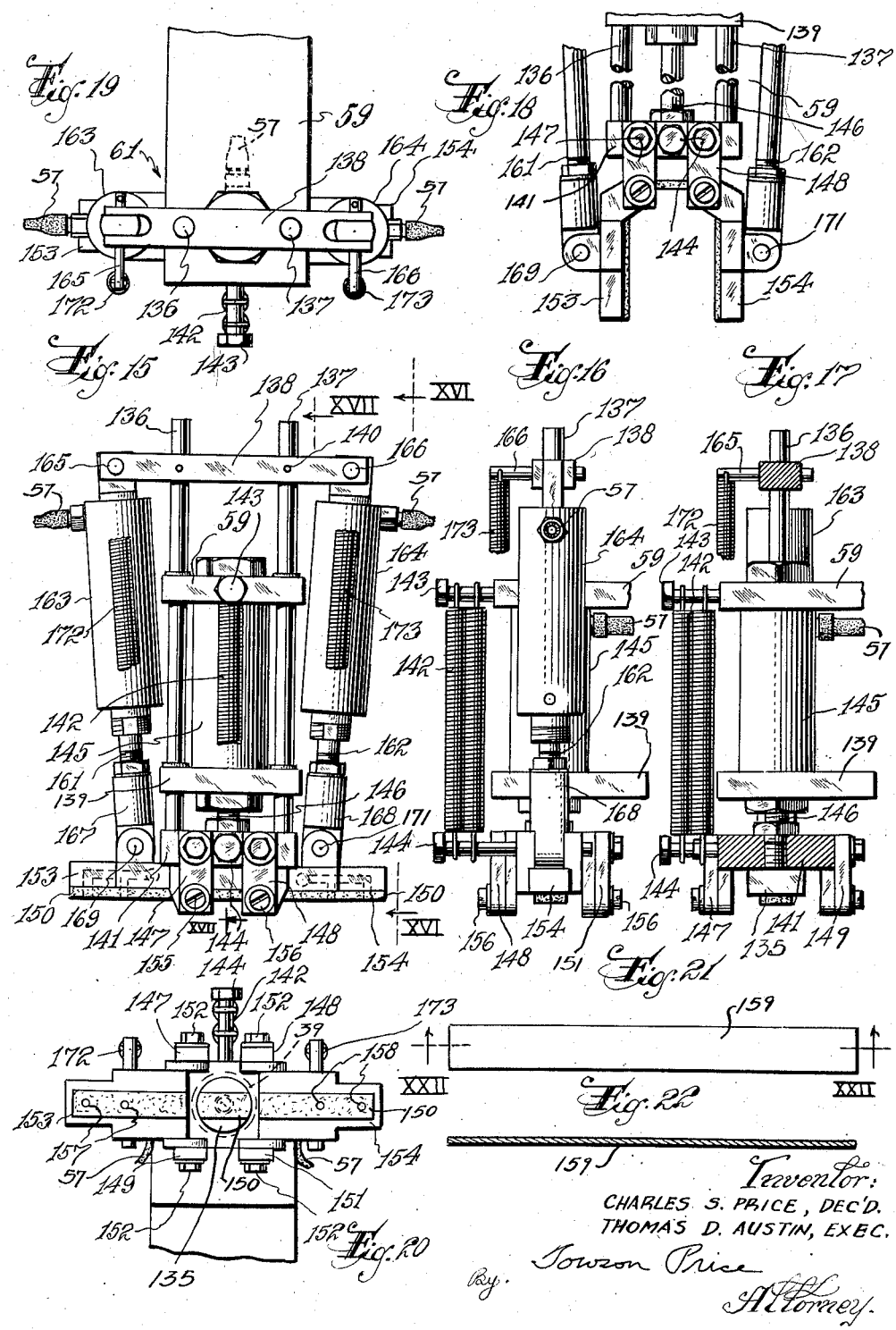

March 11, 1958 C. S. PRICE 2,826,022
APPLICATION OF WRAPS AND/OR STRIP STAMPS
TO THE NECKS OF BOTTLES
Filed May 23, 1956 12 Sheets-Sheet 9
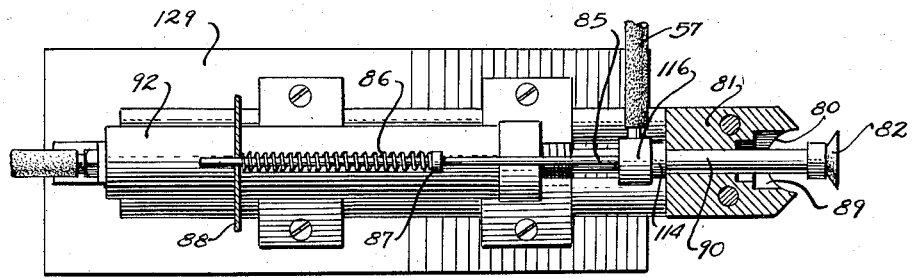
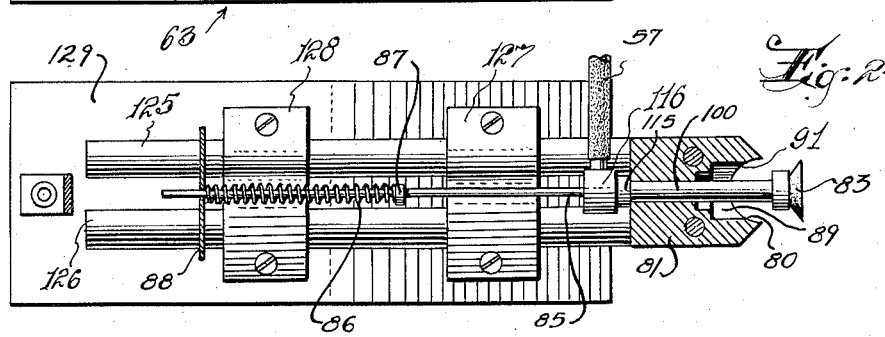
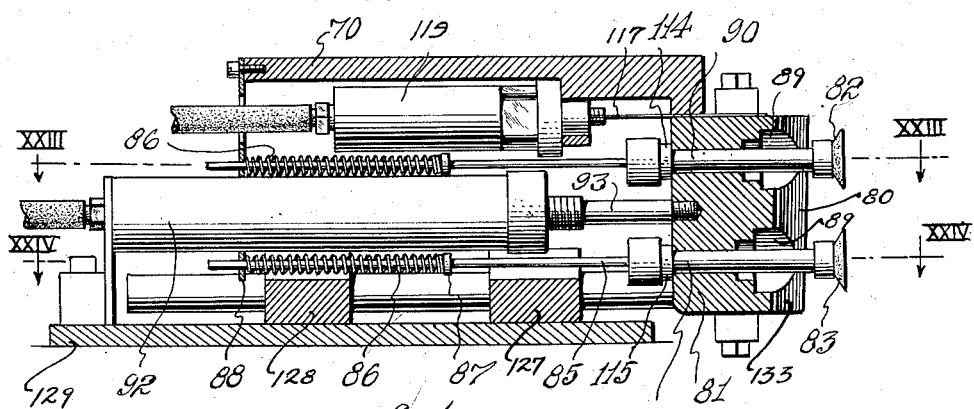
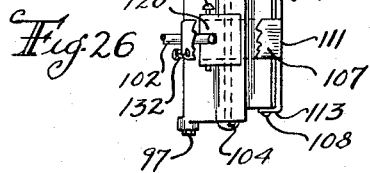
Inventor:
CHARLES S. PRICE, DEC'D.
THOMAS D. AUSTIN, EXEC.

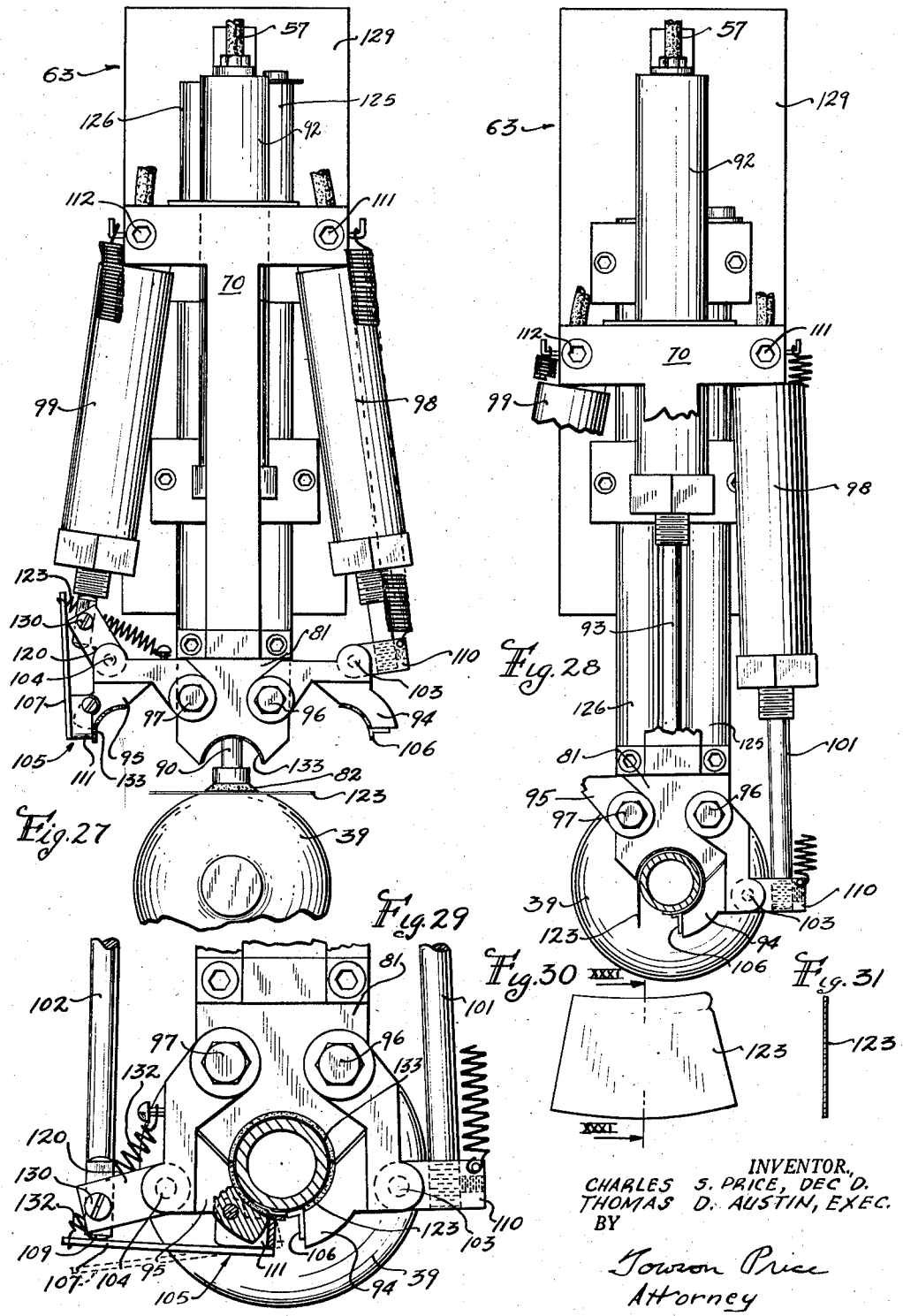

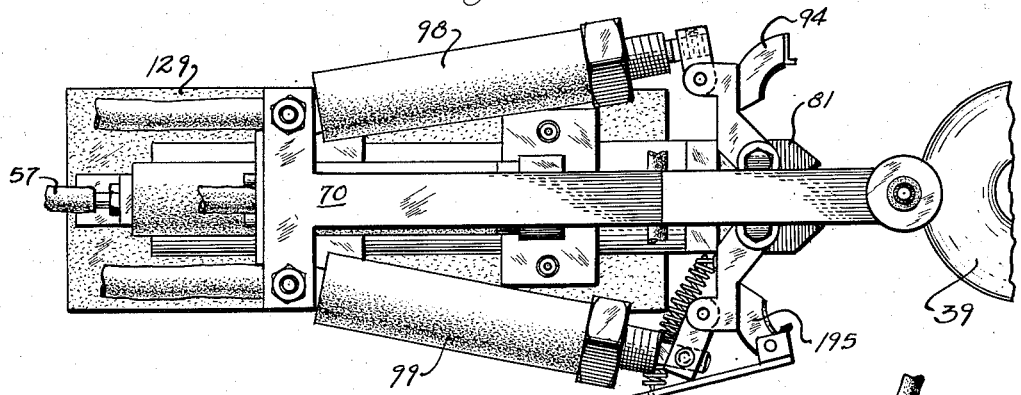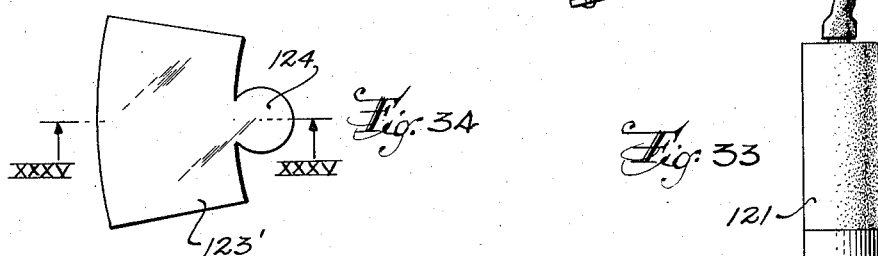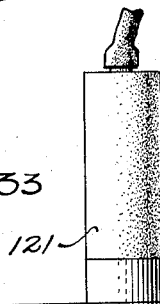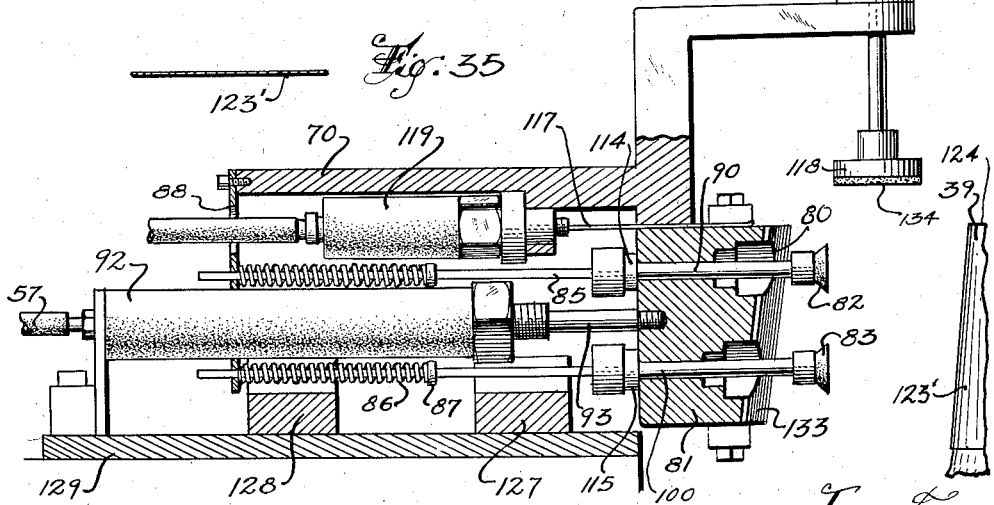

United States Patent Office 2,826,022
Patented Mar. 11, 1958

2,826,022

APPLICATION OF WRAPS AND/OR STRIP STAMPS TO THE NECKS OF BOTTLES

Charles S. Price, deceased, late of Hollis, N. Y., by Thomas D. Austin, executor, Hollis, N. Y.

Application May 23, 1956, Serial No. 586,877

24 Claims. (Cl. 53—137)

This invention relates to the automatic application of wraps and/or strip-stamps to the necks of bottles.

An object of the invention is the production of a machine to which bottles are fed from a labeling machine and upon which are automatically applied wraps and/or strip stamps sequentially to the necks of such bottles.

Another object of the invention is to provide a fully automatic machine which applies the wrap and/or strip-stamp, crimps, and then delivers the finished bottle to the case sealer.

A further object of the invention is to provide a device which automatically takes a wrap from a stack, applies glue thereto or softens it thereon, and then bends it around and seals it to the neck of a bottle, as a continuous operation.

A still further object of the invention is to provide a machine which automatically takes a strip-stamp from a stack, automatically applies glue therein, places the strip-stamp over the neck of a bottle, and then glues it in place thereon.

An additional object of the invention is to provide a unitary machine which automatically takes both a wrap and a strip-stamp from their respective containers or magazines and sequentially applies them to the necks of bottles as a desirably continuous operation.

Another object of the invention is a machine with a series of wrap and/or strip-stamp applying mechanisms, a wrap and/or strip-stamp magazine adapted to be in alignment with one of said mechanisms while a wrap and/or strip-stamp is being picked therefrom by one of the corresponding series and then with a succeeding mechanism while a similar operation is being performed, and means for effecting the operation of all of the aforesaid machine elements in properly-timed relationship.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings illustrating embodiments of the invention, wherein like reference characters denote like parts in the several views:

Figure 1 is a plan of a machine for applying government revenue or "strip-stamps" and/or wraps to the necks of bottles as said bottles continuously pass therethrough, partly in section on the line I—I of Figure 12, so that the higher strip-stamp-applying mechanism is fully shown, the wrap-applying mechanism being omitted for clarity, and the strip-stamp-applying head in the first quadrant being positioned as in Figure 4.

Figure 2 is a plan of the same machine but showing the wrap-applying mechanism, the strip-stamp-applying mechanism being omitted for clarity, and the view being partly in section on the line II—II of Figure 12, in the direction of the arrows, with the wrap-applying head in the first quadrant positioned as the strip-stamp magazine is positioned in Figure 10, the movable parts having rotated through an angle of 30° from the position of Figure 1.

Figure 3 is a plan of the machine of Figures 1 and 2, partly in section on the line III—III of Figure 12, so as to omit showing the strip-stamp and wrap mechanisms thereabove, but showing the mechanism for holding the bottles during application thereto of wraps and/or strip stamps.

Figure 4 is a fragmentary plan of the same machine, partly in section on the line IV—IV of Figure 12, that is, below the section of Figure 3, so as to show the mechanism in a position where the wrap and strip-stamp magazines have just been picked up to follow the wrap and strip-stamp heads for a predetermined distance while a strip-stamp is being picked up, then the magazines are to drop back for being again caused to follow while a wrap is being picked up, and then returned to initial positions.

Figure 5 is a fragmentary elevational view with parts in section on the line V—V of Figure 4, in the direction of the arrows.

Figure 6 is a detailed radial elevational view of the strip-stamp magazine, toward the axis of the machine or on the line VI—VI of Figure 2, in the direction of the arrows.

Figure 7 is a detailed elevational view of the wrap magazine, on the line VII—VII of Figure 2, in the direction of the arrows.

Figure 8 is a view corresponding to Figure 4, except that it is merely diagrammatic for showing a subsequent position after a strip-stamp has been removed from its magazine and the latch on the magazine carriage released, after a travel of 18°, to drop back for a wrap pick-up.

Figure 9 is a view corresponding to Figure 8, but showing a subsequent position in which the magazine carriage has actually dropped back 15° with respect to the wrap and strip-stamp heads, to a position where a wrap is to be picked up, while these heads have advanced 9°.

Figure 10 is a view corresponding to Figure 9, but showing a subsequent position in which the magazine carriage has just been released, after a travel of 18° from the position of Figure 9, for a return to the position of Figure 4 for a repetition of the operation.

Figure 11 is a plan of the machine, partly in section on the line XI—XI of Figure 12 so as to show the drive mechanism.

Figure 12 is a fragmentary elevational view, with parts in axial section, on the line XII—XII of Figure 2, of the machine of Figures 1 to 3, inclusive, and 11.

Figure 13 is a horizontal sectional view on the line XIII—XIII of Figure 14, of the fixed top valve member for connecting air pressure and vacuum to the various parts operated thereby.

Figure 14 is a vertical sectional view on the line XIV—XIV of Figure 13, in the direction of the arrows.

Figure 15 shows one of the strip-stamp-applying heads, viewed in elevation radially of the machine, that is, showing said head in front or exterior elevation.

Figure 16 is a similar view, but showing the strip-stamp-applying head in side elevation, on the line XVI—XVI of Figure 15, in the direction of the arrows.

Figure 17 is a vertical sectional view on the line XVII—XVII of Figure 15 in the direction of the arrows.

Figure 18 is a fragmentary elevational view corresponding to Figure 15, but showing the parts in strip-stamp-applying position.

Figure 19 is a fragmentary top plan of the strip-stamp-applying head of Figure 15.

Figure 20 is a bottom plan view of the strip-stampapplying head of Figure 15, the bottle top outline being shown dotted at 39.

Figure 21 is a plan of one of the strip-stamps.

Figure 22 is a sectional view on the line XXII—XXII of Figure 21, in the direction of the arrows.

Figure 23 is a plan of the wrap-holding portion of one of the heads for applying wraps to bottle necks, with parts in section on the line XXIII—XXIII of Figure 25, in the direction of the arrows.

Figure 24 is a view similar to Figure 23, but with parts in section on the line XXIV—XXIV of Figure 25, in the direction of the arrows.

Figure 25 is a side elevational view of the portions of a wrap-applying head shown in Figures 23 and 24, with parts in section on a central radial plane.

Figure 26 is an elevational view of the later-acting jaw of the head of Figures 23, 24 and 25, which bends the wrap around a bottle neck.

Figure 27 is a plan of said head showing instead of the wrap-holding suction means, the wrap-bending jaws in open position.

Figure 28 is a view corresponding to Figure 27, but showing only the jaw 94 closed and the other jaw 95, which is here open as in Figure 27, broken away.

Figure 29 is a view corresponding to Figure 28, but showing the jaws fully closed about a wrap and a bottle neck, part of the jaw 95 being shown in horizontal section on the line XXIX—XXIX of Figure 26, in the direction of the arrows, and the final position of the lever 107 being represented in dotted lines.

Figure 30 is a plan of the form of wrap used with the head of Figures 23 to 28, inclusive, before being bent around a bottle neck.

Figure 31 is a sectional view on the line XXXI—XXXI of Figure 30, in the direction of the arrows.

Figure 32 is a view corresponding to Figure 27, but showing a modification.

Figure 33 is a view corresponding to Figure 25, but showing the modification of Figure 32.

Figure 34 is a plan of one of the wraps used with the embodiment of Figures 32 and 33.

Figure 35 is a sectional view of the wrap, on the line XXXV—XXXV of Figure 34, in the direction of the arrows.

Figure 36:
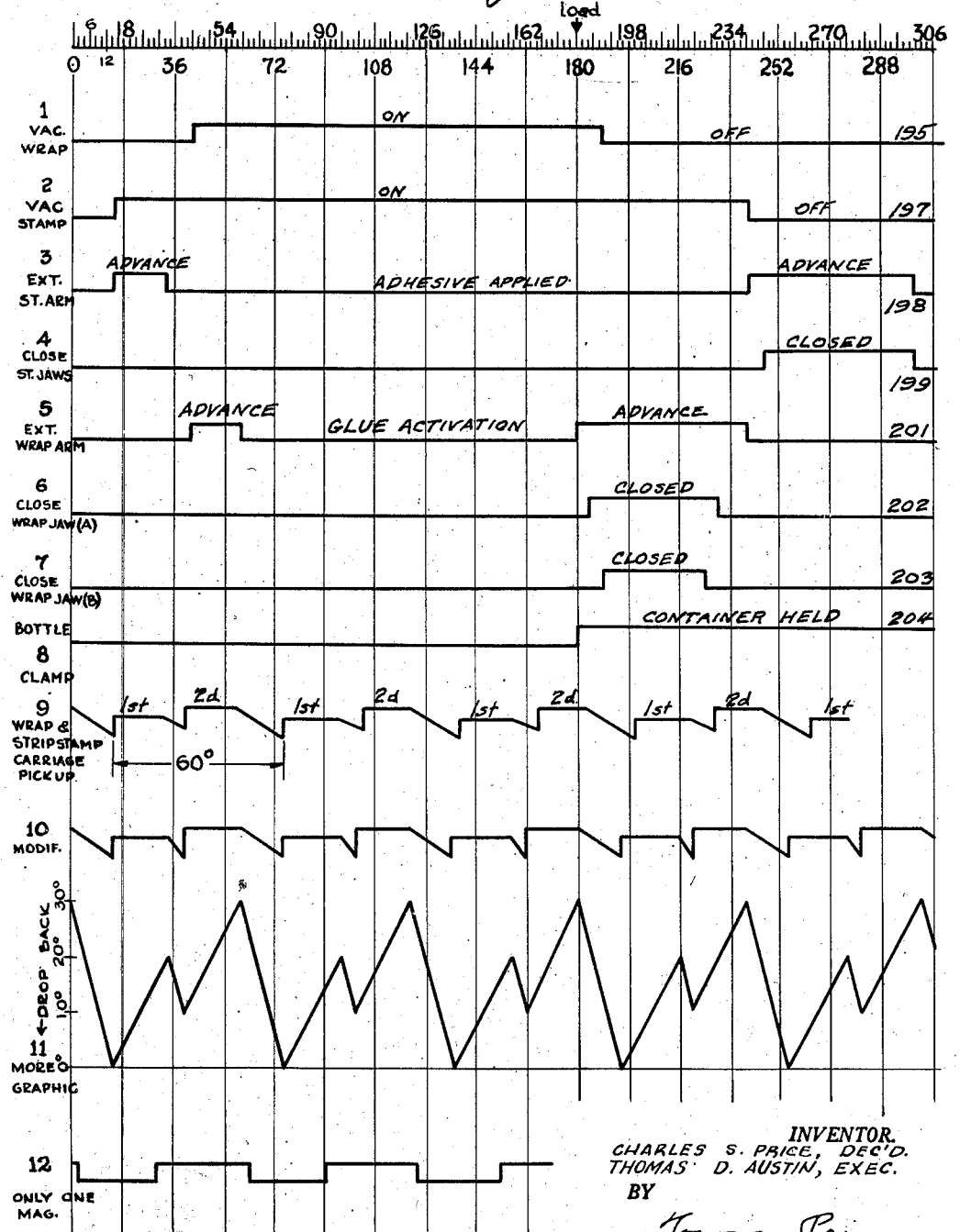
Figure 36 is a chart showing the sequence of operations.

The machine to be now described has been developed to eliminate all hand labor in the application of neck wraps and/or strip-stamps to bottles, from the labeling machine to the case sealer. It operates on a continuous basis, that is, bottles flow through the machine of the disclosed embodiment without interruption. There is no stopping and restarting of the machine and this makes for quiet, trouble-free operation.

The machine includes mechanism to pick up and apply wraps and strip-stamps, or one of these elements, which mechanism is operated by compressed air and vacuum. The air and vacuum are connected to devices, which are termed "pneumatic hands," through a valve or commutator which delivers exactly as required, causing the hands to pick up and apply the wraps and/or strip stamps in proper sequence. Basically, the machine consists of a belt or chain conveyor which feeds bottles to a rotary turret comprising a series of spiders or discs carrying a series of equally spaced bottle-processing devices at their peripheries. Thus, the turret carries two series of "pneumatic hands," one for the wraps and the other for the strip-stamps, as well as means, such as pneumatic clamps, for driving the bottles while holding them in place, that is, in predetermined fixed relative positions during application of the wraps and/or strip-stamps, after such have been conditioned for properly adhering to said bottles or other containers.

The bottles flow to the mechanism continuously and are picked off one by one by the driving means and, after operation of the associated pneumatic clamps, carried around through the various operations, thereafter being released to the conveyor line. At the point of release, the entire assembly, that is, the bottle with its wrap and/or strip-stamp, is desirably finished by operation of a crimping head such as described and claimed in the Price Patent No. 2,689,074, dated September 14, 1954, and also operated on such compressed air, although other crimping means may be employed.

Before passing to the machine, a label spotter is provided to turn each bottle to the proper position so that when it is on the conveyor traveling to the rotary turret it will be turned to receive the wrap and/or strip-stamp at the proper point to register with the previously applied front label on the bottle.

While this machine can be arranged to use paper or ungummed paper-backed foil wraps and apply wet glue to these wraps, it is preferred to use wraps coated with heat-softening glue, such as "Pervenac," which eliminates the necessity for on-the-machine glue application. Each wrap may then be heat sensitized and clamped around the bottle neck, making a neat and permanent job. When applying a strip-stamp, it is necessary to use strip-stamp glue, which is desirably applied by means of a glue wheel as the stamp-carrying "pneumatic hand" or strip-stamp device passes over it on its way to the bottle.

The chain conveyor

The conveyor, generally designated 31, is illustrated in Figures 1 to 3, inclusive, 11 and 12. It comprises a series of belts or chains, desirably formed as conventional link belts 32, traveling over a series of generally cylindrical pulleys or drums 33. One of these pulleys 33 is driven by a suitable prime mover, such as a motor 34, through suitable gearing 35. The series of link belts 32, if more than one are used, are connected together so that all move as a unit, as by means of chains 36 passing over sprocket wheels 37, mounted on corresponding ends of the shafts 38 which carry the pulleys 33.

The intermediate section of link belt 32 which extends from one side to the other of the rotary turret, generally designated 41, is offset from the vertical axis of said turret so as to clear the hollow vertical turret drive shaft 42, as shown most clearly in Figures 3 and 11. In order to prevent the bottles 39 from passing off the belt 32 prior to reaching the rotary turret 41, there are provided guide rails 43 and 44 along the incoming section of the belt 32, and guide rails 45 and 46 along the outgoing section of said belt.

To prevent the bottles 39 from crowding one another as they reach the rotary turret 41, a spacing device 47 is provided which oscillates back and forth in synchronism with the movement of the rotary turret, being driven therefrom as will later be explained. In a similar way, the bottles are removed from the rotary turret, and returned to the section of belt therebeyond, by means of a star wheel 48 which rotates counter-clockwise and has arms 49 engaging the bottles as they reach the end of their travel with the rotary turret 41, and moves them one by one therefrom to the belt 32. This star wheel 48 is also driven from the rotary turret in a manner which will later be explained. The Tracy et al. Patent No. 2,630,260, dated March 3, 1953, is referred to as disclosing a similar conveyor.

Rotary turret

The rotary conveyor or turret 41 is most clearly shown in Figures 1 to 5, inclusive, and 12. It comprises the hollow vertical shaft 42, rotatable in suitable bearings, including a lower thrust bearing 240, in a frame 40 which may comprise a base 51 from which upstand legs supporting a platform or top 170 forming a table around which the bottles 39 to be processed are carried. A desirably doubly longitudinally apertured stationary shaft 52 is disposed interiorly thereof. The shaft 42 carries the rotatable portion 53 of the air timer or commutator, generally designated 54. The stationary portion 55 of the air commutator is carried by the shaft 52. Below the air timer is the strip-stamp-head-carrying disc or spider 56. Tubes 57 extend from the rotatable portion 53 of the air timer in position for connection with the strip-stamp-applying heads and vacuum picker devices 61 for applying the well-known paper revenue stamps 159 and pneumatic wrap-applying hands 63 therebeneath.

The disc or spider 56 carries arms 59 on each of which is mounted, as the base plate thereof, one of the strip-stamp-applying devices 61. Beneath the disc or spider 56, is mounted a similar disc or spider 58, carrying a series of pneumatic wrap-applying hands and vacuum picker devices 63, equally and similarly spaced, like the strip-stamp-applying devices 61, so that each pneumatic wrap-applying hand 63 lies directly beneath a strip-stamp-applying device 61.

The drive mechanism for the rotary turret 41 comprises a motor or other prime mover 64, driving through suitable gearing a pinion 65 meshing with a gear 66 fixed on the hollow shaft 42. The motor 64 also, as by a crank and link connection, causes the crank 67 to oscillate and the connecting rod 68 to correspondingly reciprocate, and cause the connected crank 69 to correspondingly oscillate. Such oscillation operates the spacing device 47 through carrying vertical drive shaft 71. The gear 66 also meshes with a pinion 72 on a vertical shaft 73 which also carries a pulley 74. The pulley 74 drives the shaft 75, on which is fixed the star wheel 48, as by means of a belt 76 passing thereover and a pulley 77 on the star-wheel-carrying shaft 75. The fixed portion 55 of the air commutator 54 receives compressed air and vacuum, respectively, through the ports 50 and 60 in the shaft 52 connecting respectively with tubes or pipes 78 and 79 extending from suitable sources thereof (not shown).

*The pneumatic wrap-applying "hands"*

The pneumatic wrap-applying "hands," each generally designated 63, are most clearly illustrated assembled with the main portion of the machine in Figures 2 and 12, and separated therefrom and in detail in Figures 23 to 29, inclusive, 32 and 33. Inasmuch as each of these six "hands" shown in Figure 2 is identical, the details of only one will be described, including the alternative of Figures 32 and 33. Each hand comprises a base plate 129 secured to the spider 58. Each hand includes a head 81 having a nearly semi-cylindrical but slightly semi-conical trough 80, formed to receive the correspondingly shaped neck of a bottle 39 around which a wrap 123 in accordance with Figures 30 and 31, or 123' in accordance with Figures 34 and 35, is to be applied. The wrap-engaging surfaces of the head 81 are desirably padded with thin sheet rubber 133 or other resilient material. The head 81 is supplied with two vertical bottle neck encircling jaws 94 and 95 actuated, respectively, by compressed air cylinders 98 and 99, and one or more, in the present embodiment two, spring-loaded desirably rubber suction cups 82 and 83.

These suction cups are carried on suction tubes 90 and 100, which pass through the head 81 and are normally kept in a forward or outward position, extending out from the head, by means of helical springs 86 acting between stop collars 87 on the push rod extension 85 and an abutment 88 carried by the cover or top portion 70 of the hand 63. Said push rods serve as guides and normally hold the suction cups fully extended as far as stops 114 and 115 on the suction tubes will allow. Suction in these cups is supplied through the vacuum tubes 90 and 100 by means of flexible hose 57 connected to the outstanding tubular portions of angle fittings 116, which project at right angles to said vacuum tubes.

These suction cups are pushed to the left, as viewed in these figures, into the corresponding pockets 89 in the head 81 when pressure is exerted thereagainst, as when a head is advanced or moved outward to engage the neck of a bottle 39, as shown most clearly in Figures 28 and 29, where the suction cups are telescoped into the pockets 89.

Additional features of this hand which are used in certain instances, as when the wraps are as designated 123' in Figures 34 and 35, and have extensions 124 adapted to overlie the tops of the bottle closures or corks, are a reciprocable blade 117 and a closing head 118 (Figures 32 and 33). These two units are respectively actuated by air cylinders 119 and 121, and operate in conjunction with the jaws 94 and 95 to entirely enclose in a wrap 123' the neck of a bottle and its cork or other closure, if desired. Although the cylinder 119 and blade 117 are also illustrated in Figure 25, they are not necessary in this first embodiment.

In some cases the top of the bottle, mentioned as only an example of containers which may be processed, is left open, the wrap, designated 123 in Figures 30 and 31 covering merely the portion from the top downward a normal distance, and desirably being such as described and claimed in the Price Patent No. 2,666,542, dated January 19, 1954. When it is desired to cover the top, then the wrap consists of a blank 123', otherwise the wrap does not have the nearly circular top extension or flap 124. The cover portion 70, head 81, jaws 94 and 95, as well as blade 117, head 118 and the actuating cylinders 119 and 121, if used, are securely mounted on the two guide rods 125 and 126, reciprocably passing through bearing blocks 127 and 128, permitting the desired amount, say about two inches, of radial motion toward and away from the bottle neck to which the wrap is to be applied. This radial motion is controlled by means of air cylinder 92, the piston rod 93 of which is securely anchored in the head 81, as by the indicated threading, the cylinder itself being fastened securely to the base plate 129. By means of this air cylinder 92, and associated interior or exterior spring, the head 81 with the associated parts enumerated including the abutment portion 88, may be caused to extend or retract as desired.

Pivoted to each head 81, as shown most clearly in Figures 26, 27, 28, 29 and 32, is a pair of container top or bottle neck encircling jaws 94 and 95, the purpose of which is to bend a wrap 123 or 123' around the container top or neck of a bottle and secure it in place by adhesive. The pivots of these jaws are respectively indicated at 96 and 97. The jaws are independently operated by means of pistons in the cylinders 98 and 99, respectively. These pistons have rods 101 and 102, respectively, the outer end of rod 101 fixedly carrying a block 110 as by having its end threaded and received in a correspondingly threaded aperture in said block and locked in place by a set screw. The block 110 is pivotally connected to the jaw 94 as indicated at 103. The outer end of the rod 102 is pivotally connected to a block 120, as indicated at 130, which block is, in turn, pivoted to the jaw 95, as indicated at 104. The jaws 94 and 95 are not operated at the same time, the jaw 94 being formed to close about the bottle neck ahead of the basic jaw 95. The latter has a "knuckle" portion formed as a bail 105 comprising an intermediate portion 111 which extends from top to bottom thereof, and has lugs 112 and 113, one at each end, respectively pivoted to the top and bottom of said basic jaw to complete it, as indicated at 108. When the jaw 95 is closed as in Figure 29, the portion 111 extends close to but does not overlap a projection 106 on the jaw 94.

In order that the engagement of the overlapping wrap edge portions will make a secure seal, it will be under generally high and resilient pressure. So as to make sure of such desired pressure, the bail 105 is provided with a lever 107 firmly secured to the central part thereof, as by making it integral therewith, and so connected to said jaw by the pivots 108. The lever 107 is urged clockwise by resilient means such as a coil spring 132. This spring initially holds the lever 107 and engaged block 120 in the position of Figures 27 and 32. After the head 81 is advanced, the block 120 is still pulled clockwise by the spring 132 and lever 107. The basic jaw 95 is then swung to closed position (Figure 29), the jaw 94 having previously been closed to the position of Figure 28. After the basic jaw 95 has engaged the wrap, the block 120 is swung counter-clockwise upon further movement of the rod 102, so that finally the end 109 of said rod forces the lever 107, against the action of its spring 132, moving the bail 105 counterclockwise with respect to said basic jaw, to the position shown most clearly in Figure 29, taking the dotted line position of said lever, and exerts the required force through the leverage provided to firmly press the overlapping edge of the wrap on the wrap edge underlying it, thereby effecting a firm seal therebetween. This action is facilitated by padding all of the jaw surfaces which are to engage the wrap, including the surface of the bail which is to engage the overlapping edge portions of said wrap, with thin sheet rubber or other resilient material 133, like that padding the head 81.

To allow for lateral swinging of the rods 101 and 102, the inner ends of the cylinders 98 and 99 are respectively pivoted to the fixed portion 70 of the hand 63, as indicated at 111 and 112. Springs, which may be exterior or contained in the cylinders 98 and 99, serve to return the jaws to open positions upon release of air pressure, and such are also used with the blade 117 and head 118, if used.

A vacuum connection is made with each suction cup 82 and 83 through one of the flexible tubes or hose 57 which extends to the rotatable portion 53 of the pneumatic commutator 54, and from there to the fixed portion 55 thereof, to thereby connect through the port 60 with the vacuum line 79 at appropriate times. In a similar way, compressed air connections are made with the head moving cylinder 92 and the jaw moving cylinders 98 and 99, so that they are at appropriate times operated by compressed air through port 50 from the air line 78. An exterior return spring for the head 81 is illustrated at 247 in Figure 12. However, if desired, vacuum (79a) and compressed air (78a) connections may be made directly with the stationary portion 55 of the air commutator or timer 54 without passing through the fixed shaft 52, represented in dot-dash lines in Figure 14, as will be understood by those skilled in the art.

*Strip-stamp-applying devices or "hands"*

The pneumatic strip-stamp-applying "hands" or devices 61 are most clearly illustrated in detail in Figures 15 to 20, inclusive, and six are shown assembled with the remainder of the machine in Figures 1 and 12. A strip-stamp is illustrated in Figures 21 and 22. Inasmuch as these six devices are identical, the details of only one will be described. Each device 61 comprises a base plate 59, through which slidably extend vertical guide rods 136 and 137. These rods in turn carry an upper abutment 138, secured thereto as by means of set screws 140, slidably pass through a platform 139, and carry a lower block 141. The block 141 may be secured to the rods 136 and 137 by set screws (not shown). The block 141 is guided to and from the base plate 59 by the rods 136 and 137 and normally held in its upper position therebeneath by means of return spring or springs 142 secured to said base plate by bolt 143 and to the block 141 by a bolt 144. A piston in operating cylinder 145 having a rod 146 secured to the block 141 serves to move the latter down from the base plate 59 when compressed air is introduced into the cylinder 145, to the position represented in Figure 18.

The block 141 has four short bars 147, 148, 149 and 151, secured thereto by means of bolts 152 and serving to pivotally support strip-stamp-picking-up and applying levers 153 and 154, as by connection therewith by means of screws 155 and 156. These levers are hollow, with downwardly extending ports 157 and 158, so that the interior thereof may be connected to a source of vacuum, as through flexible tubes 57 from the timer 54, so that they may serve to hold strip-stamps. The distance between the adjacent ends of said levers, when their lower surfaces are horizontal as viewed in Figures 15, 16, 17 and 20, is desirably approximately bridged by a depending, not necessarily cylindrical, boss 135, formed either integral with the block 141 or separate and secured thereto as by screw means illustrated. The normally lower surface of each lever 153 and 154 and the bottom of the boss 135 are desirably padded, as by carrying revenue-stamp-engageable strips 150 of thin rubber or other suitable resilient material. The strips 150 on the levers 153 and 154 are correspondingly ported. The levers 153 and 154 are movable from the position of Figure 15 to that of Figure 18 by piston rods 161 and 162, respectively extending from pistons in the air cylinders 163 and 164.

The cylinders 163 and 164 are respectively pivoted at their upper ends by means of pins 165 and 166 to the upper abutment 138. The lower ends of the piston rods 161 and 162 are respectively pivotally connected to the levers 153 and 154 by means of pins 169 and 171. The levers 153 and 154 are normally held in open positions illustrated in Figures 15, 16, 17, 19 and 20 by helical springs 172 and 173, respectively extending between pins 165 and 169 on the one hand, and pins 166 and 171 on the other. Air is supplied to the cylinders 145, 163 and 164 by means of flexible tubes 57 from the timer 54, so that the block 141 may be moved down and the levers 153 and 154 swung to the closed or folded-down position of Figure 18.

*The bottle holding clamps*

The bottle holding clamps, generally designated 181, are most clearly illustrated assembled with the main portion of the machine in Figures 3 and 12. Each clamp desirably comprises a pair of bottle-engaging arms or stationary jaws 182 and a movable jaw 183. Each stationary jaw is secured to one of the discs or spiders 52 and 190 fixedly mounted on the shaft 42, and the rotating jaws 183 are pivoted to the fixed portions, as indicated at 185. They operate between open position, shown at the extreme top of Figure 3, and closed position shown to the left thereof, by means of pistons operating in compressed air cylinders 186. Each piston has a rod 187, the outer end of which is pivoted to the jaw 183, as indicated at 188. The inner end of each cylinder 186 is pivotally mounted on a spider or disc 189, also fixedly secured to the shaft 42. The clamps 181 are operated between the open position where they receive bottles, shown at the lower portion of Figure 3, and the closed position to the left thereof, by means of compressed air admitted from line 78, through the port 50 in shaft 52, to a flexible hose or tube 57 extending from the lower surface of the rotating pneumatic timer 53, so that said clamps are at the proper times closed to grip therein bottles 39 being processed, and at other times allowed to open by means of coil return springs (not shown) which may be in or outside of the cylinders and which cause the pistons to move to the rear or inner ends of their cylinders.

*Pneumatic timer, valve or commutator*

The pneumatic timer or valve, generally designated 54, is shown assembled with the other parts of the machine in Figure 12, and in detail in Figures 13 and 14. It comprises a top member 55, fixed on the shaft 52 which is non-rotating, and pressed into engagement with the rotating bottom member 53 by means of coil springs 191 acting between a plate 192 held on top of the shaft 52, as by means of a pair of nuts 193 on the ends of corresponding studs 245, the lower portions of which threadably engage the top of the shaft 52, and engaging a boss or separate disc 194 on said top portion. The hollow fixed top portion 55 is divided into vacuum and compressed air compartments by a partition 200 and has its lower surface provided with a series of arcuate ports 195, 197 to 199 and 201 to 204, both inclusive, extending on preferably equally-spaced circumferences partly around the axis thereof and connected with a source of compressed air or vacuum through the port 50 or the port 60. These arcuate ports are so positioned and of such length that vacuum or compressed air therefrom is, at appropriate times, connected to ports opening upwardly from the rotating part 53, desirably spaced from said fixed part 55 by a suitable gasket 246, and the lower ends of which terminate in flexible tubes 57 which extend to the various vacuum and air-operated machine parts.

The innermost port, designated 195, is connected to the vacuum line 79 through the shaft 52 by means of the vacuum chamber 196 of the fixed member 55 to the vacuum port 60 in the shaft which connects said line to said chamber. The port 197 serves for supplying vacuum to the hollow levers 153 and 154 of the strip-stamp-applying devices 61. The port 195 is for the purpose of making a vacuum connection with the suction cups 82 and 83 of the pneumatic hands 63. In the same way, the port 198, which is formed in two sections, is for connecting air pressure from the line 78 to the strip-stamp devices for extending them to pick up strip-stamps from the strip-stamp magazine 224 while said magazine is in alignment with, or indexed with respect to, one of the strip-stamp applying devices, and then later applying them to the tops of bottle necks. The port 199 is for connecting compressed air to the hollow lever or jaw-operating cylinders 163 and 164 of the strip-stamp devices 61, so as to cause them at the proper times to bend the end portions of a strip-stamp 159, the central portion of which engages the top of a closed bottle neck, down along opposite sides of a bottle neck to securely glue it thereto.

The port 201 also formed in two sections, is for applying compressed air to the head-operating cylinders 92 at the proper times to cause them to move to the wrap magazine 224, remove wraps therefrom while said magazine is in alignment with, or indexed with respect to, one of the wrap-applying hands 63, and thereafter applying them to the necks of bottles in the machine. The port 202 is for supplying compressed air to the cylinders 98 to operate the jaws 94 for bending one side of each wrap around the neck of the bottle to which applied. Likewise, the port 203 is for supplying compressed air to the cylinders 99 for thereafter closing the jaws 95 and bending the other side of each wrap around the neck of the bottle to which applied, while insuring the application of pressure to the overlapped edges for tightly sealing said wrap in place. The port 204 is for supplying at the proper times compressed air to the cylinders 156 of the movable clamping jaws 183 for holding bottles firmly in place during the processing thereof. If the cylinders 119 and 121 are employed, two additional air pressure ports (not shown) would be formed in the fixed top portion 55, and cooperating ports with connecting tubes (not shown) in the movable portion 53, for respectively operating the pistons in said cylinders. The ports 195, 197, 198, 199, 201, 202, 203 and 204 are approximately positioned as compared with only line 12 (the operation of only one at a time of the strip-stamp and wrap devices) of the showing of Figure 36. Appropriate changes are necessary if the disclosures of the other lines are to be here illustrated.

Although there is for simplicity disclosed a timer which connects with a source of vacuum and a source of compressed air, with normal leakage relied on for breaking the vacuum and springs relied on for returning the pressure-operated parts to initial positions as the compressed air dissipates after the source is cut off, yet no limitation to this method of operation is intended as a timer may instead by employed which definitely releases the vacuum, and the pressure operated devices controlled by it may be double-acting, with air pressure causing movement in both directions and a definite release of back-pressure upon a reversal of movement.

*The wrap and strip-stamp magazines and their carriage*

The magazines and the carriage 216 for said magazines which respectively hold the wraps 123 or 123' and the strip-stamps 159, is most clearly illustrated in Figures 2, 4 to 10, inclusive, and 12. This carriage 216 is pivoted on the hollow vertical shaft 42, that is, coaxially with the spiders 56 and 58 which respectively carry the heads for applying the strip-stamps and wraps after removing them one by one from the magazines 223 and 224. Thus, it is not fixed on the hollow shaft 42 like these spiders, but rather pivotally mounted thereon and its hub may be supported on the table top 170 or a washer 237 thereon. It is formed at its outer end with an upstanding wall portion 160, terminating at its upper end in a horizontal, inwardly-extending shelf portion 174 for the support of the magazines 223 and 224. This shelf portion may be made adjustable in height by suitable means (not shown). The carriage 216 is held in its extreme counter-clockwise position, illustrated in Figure 4, by means of a spring device and/or pneumatic cylinder and piston device 217. During operation of the machine, it oscillates from the position of Figure 4 sequentially to those of Figures 8, 9 and 10 against the opposing force of the device 217.

One end of the device 217 (the cylinder end, for example) is pivotally connected to a fixed portion of the frame, the table top 170, for instance, as indicated at 218, and the other end (the piston rod end, for example) is pivotally connected to the carriage 216, as indicated at 219. This carriage 216 is supported at its outer end on a track 220 as by roller means 244 on pivot members 175 secured to the wall portion 160. It holds the magazine 223 formed to feed strip-stamps to their upper position so as to be picked up one at a time by the strip-stamp devices 61. It also carries the magazine 224 formed to feed wraps to their inner position so as to be one at a time removed horizontally, while standing on edge, by the pneumatic wrap-carrying hands 63. The track 220 is supported at the tops of legs 140, and may terminate at the end of the first quadrant, as illustrated in Figures 4 and 5.

The construction of the strip-stamp magazine 223 is, per se, not part of the invention, and so will be only briefly described. It may feed such stamps from a stack or from a roll, although only a stack holding magazine is illustrated. However, see the Strout Patent No. 2,089,769, dated August 10, 1937, and the Holmwood et al. Patent No. 2,615,492, dated October 28, 1952, as showing ways of feeding articles from a roll. Referring to Figures 2, 4 and 6, it may comprise guides 205 and 206 between which is received a stack of strip-stamps supported by a follower 207 and held at the upper end by overlying flanges 208 and 209. These flanges only lightly hold the extreme end portions of the top strip-stamp so as not to appreciably interfere with removing it when the strip-stamp levers 153 and 154 engage it. Supporting means 210 are provided below the follower 207 for holding the stack so that the upper stamp lightly engages the flanges 208 and 209, which means may be resilient in the form of a spring and lever arrangement 210, an air cylinder and piston, or a counter-balancing weight. Inasmuch as those skilled in the art will understand that the details of this device are not important, just so the specified function is obtained, further descripton is believed to be unnecessary.

The wrap magazine 224 may be similarly constructed except that it feeds wraps horizontally rather than strip-stamps vertically. Horizontal guides 211 and 212 are provided, see Figures 2, 4 and 7, for the lateral edges of a radially extending stack of wraps and a follower 213 is disposed outwardly thereof. Flanges 214 and 215 lightly hold lateral edges of the innermost wrap in position, so as not to appreciably interfere with its withdrawal by the suction cups of a pneumatic hand 63. Means 227 are provided for holding the follower 213 in place against the outer end of the stack of wraps, said means desirably being adjustable, as in the form of spring means the amount of compression of which may be varied (not shown) or in the form of a piston in an air cylinder 227 connected to a suitable source of compressed air, as by a tube 236, whereby the pressure against the stack may be adjusted so as to give that which works best. As another alternative, a weight may be used. The Lissimor Patents No. 2,542,282, dated February 20, 1951, and No. 2,565,975, dated August 28, 1951, and the Pomeroy et al. Patent No. 2,630,956, dated March 10, 1953, are referred to as showing such alternative methods of feeding.

The strip-stamp applier 61 of each set is disposed directly above the corresponding hand 63 for applying wraps to bottle necks. It is impossible because of their construction to have the magazines 223 and 224 for the strip-stamps and wraps at the same angular location on the carriage 216. Therefore, it is necessary to provide for a shifting of position between said carriage and the spiders 56 and 58 which carry the strip-stamp and wrap appliers for the sequential pick-up of first one and then the other, that is, first a strip-stamp and then a wrap, or vice versa, if a strip-stamp and a wrap are both to be applied to a container.

This relative movement during pick-up is provided for by having a latch member 225 movably mounted on the top surface of the carriage 216 by means of a pivot 226. This latch member has an angular end part 234, a portion 241 of which extends downwardly below the carriage 216, and it is resiliently urged clockwise by means of a spring 228 acting between it and the upstanding wall portion 160 on the carriage 216. The latch member is prevented from an undesired amount of clockwise turning by a stop post 238 upstanding from said carriage, or by engagement of its downward extension with a vertical edge surface thereof. Cooperating with this latch member 225 are a series of pairs or sets of lugs or posts, 229 and 231, depending from the spider 62. There are the same number of sets of these lugs as there are heads, that is, six, for example. The lugs 229, however, are disposed at a larger radius from the spider pivotal axis than the lugs 231. The latch member 225 has a tongue 232 or operative portion, desirably replaceable upon undue wear, as indicated by the bolted connection. This tongue 232 is engaged by first the lug 229 to cause the carriage 216 to travel with the spider 62 from the position of Figure 4 to that of Figure 8. During such movement a strip-stamp (or wrap) is picked up from the aligned or indexed magazine 223 (or 224).

There is a lug or stop roller 233 rotatable about an axis normally fixed with respect to the frame of the machine. However, its position may be adjustable to allow for desired variations in the operation of the machine, as discussed in connection with Figure 36, by having its pivot member slidable to an adjusted position in a circumferential receiving slot 243 in the table top 170. Upon reaching the position of Figure 8, this roller 233 is engaged by the angular end part 234 of the latch 225, moving it counter-clockwise, releasing it from the lug 229, and allowing the carriage 216 to drop back under the influence of the resilient device 217 to the position of Figure 9. Here the tongue of its latch is engaged by the associated lug 231, as the spider moves clockwise. When the carriage 216 has been moved by the spider 62 to the position of Figure 10, the lug or stop roller 235, also rotatable about an axis normally fixed with respect to the frame of the machine, but disposed closer to the axis of the spider than the roller 233, in turn is engaged by the angular end 234 of said latch. Said latch is then released from the lug 231, and the carriage 216 allowed to be returned to engagement with a rubber bumper 239 desirably fixed on the table top 170, that is, to the position of Figure 4, for a repetition of the operation by the next pair of lugs 229 and 231. The depending part 241 is cut out as indicated at 242, or formed short enough, to avoid being engaged by the roller 233 when the latch 225 is engaged by the post 231.

*Operation*

Figure 36 is a chart representing how the machine, previously described, may be operated for the purpose of affixing neck wraps and strip-stamps to filled, corked and labeled bottles. While the bottles are being fed to the machine, as viewed in Figures 1, 2, 3 and 12, the spiders 56 and 58 carrying the heads 61 and 63 rotate therewith. The spiders 190 and 62, respectively, as means for transporting containers through the machine in predetermined fixed relative positions, carry the bottle clamps 181 for causing the bottles to travel with the spiders, around the rotary conveyor so formed, from the point where they are taken from the delivery end of the carrying belt, to the point where they are discharged to the receiving end of said belt.

The point at which the bottles are loaded from the conveyor belt onto the rotary conveyor around which they are pushed by the stationary part of the clamps 181, has been arbitrarily set as 180° on the chart of Figure 36. This means that the zero degrees position on the chart is in this instance offset 15° from the vertical diametral plane of the rotary turret 41 which is parallel to the direction of movement of the conveyor belt, as viewed in Figures 1, 2 and 3.

In the lines 1 through 9 of the chart showing the first embodiment under consideration, line 1 of the chart represents the angular duration of the vacuum application to the suction cups 82 and 83 of each pneumatic hand 63 or wrap-carrying device as it is moved around by its rotary conveyor or spider. The opening of the corresponding port 195 is sufficiently earlier, in accordance with what might be termed the "inertia" characteristics of the machine, to insure the desired time of suction application. This comment also applies to all of the arcuate ports in the pneumatic timer 54. In this embodiment there is shown the application of vacuum to the suction cups from 42° to 189°. That is, this duration includes the portion of line 5 where the wrap device is extended for 18° while picking up a wrap, that is from 42° to 60°, and overlapping with the extension of the wrap device per line 5 beginning at 180°, where it pushes the wrap to the bottle neck, this operation being concluded at about 240°.

Line 2 represents the corresponding application of vacuum to the strip-stamp holding hollow arms 153 and 154 of the strip-stamp device illustrated in Figures 15 to 20, inclusive. In other words, the vacuum is applied at 15° and terminated at about 241°. This application of vacuum includes the showing of line 3 where the stamp arm is extended, beginning at 15° and withdrawn after 18° extension at 33° and, after the application of glue to the strip-stamp, again extended at about 241° and withdrawn at about 300°.

Line 4 shows the position at which the jaws or levers 153 and 154 of the strip-stamp device are rotated down or closed about the neck of an associated bottle for the application of a strip-stamp thereto. That is, this closing of the jaws occurs at about 246° and terminates at about 300°.

Line 6 shows the position at which the wrap jaw (A), or that designated 94 in Figures 27, 28, 29 and 32, is closed to turn one edge portion of a wrap about the neck of a bottle after said wrap has been moved to the bottle, as indicated by line 5 at 180°. This closing occurs at about 184° and is continued until the bottle reaches about 230°, when the jaw opens. During this interval, however, as shown by line 7, jaw (B), or that designated 95 in Figures 26, 27, 28, 29 and 32, closes to turn the other edge portion of the wrap over the edge first turned at about 189°, tightly seal the engaged edges together by the final swing of the bail or "knuckle" 105, and opens again at about 225°. As shown on line 8, the bottle clamps close at 180°, that is, as the bottles are loaded, to hold the bottles in position until reaching 312°, after all the other operations have been effected. The bottles may be discharged to the receiving part of the belt at about 315°. It will be noted, however, that the diagrams of Figure 36 do not extend far enough to show this discharge position.

Line 9 of the chart shows one way in which the wrap and strip-stamp carriage may operate, that is, when picked up and when released by the head spider 62, as described in connection with Figures 2, 4 to 10, inclusive, and 12. The first pick-up of the strip-stamp and wrap carriage 216 occurs when the central radial plane of the strip-stamp magazine is at an angle of 30° to the diametral plane of the machine which parallels the chain conveyor, or as shown by Figure 36, when it is at 15°.

The carriage is thus picked up at 15° and carried with the spider 62 for 18°, whereupon the latch 225 disengages from the first post 229 depending from the spider, upon the angular part 234 engaging the roller 233 pivoted about a fixed axis, and drops back 15° (with respect to the spider) to be engaged by the second post 231, also depending from said spider. This dropping-back operation is considered to occur while the spider advances 9°, so that the net drop-back of the carriage 216 is 6°. The second pick-up, that is by the post 231, thus occurs by the second post when at 42°, and is continued for 18°, that is, until the spider has traveled to 60°. The latch 225 is thereupon again released, this time, by the second fixed stop 235, and the magazine carriage 216 allowed to return to the position of Figure 4, that is, dropped back through 30° ready for the next pick-up in connection with the succeeding pair of heads 61 and 63 on the spiders 56 and 58, and the performance of a similar operation.

Line 10 of the chart shows a modified manner in which the wrap and strip-stamp carriage may operate, whereby a greater angular distance, and correspondingly greater time, is allowed for picking up a strip-stamp and a wrap. The purpose of this is to show how flexible the machine is, whereby it may be adjusted to allow more or less strip-stamp and wrap processing time, during corresponding magazine indexing and less or more drop-back time, the return device 217 being, of course, adjusted if necessary to effect such drop back in the time allowed. In accordance with this embodiment, the first pick-up of the strip-stamp and wrap carriage 216 occurs when the central radial plane of the strip-stamp magazine 223 is as before at 15°.

The difference in this embodiment, however, is that after being picked up at 15°, it is carried with the spider 62 for 20°, whereupon the latch 225 disengages from the first post 229 depending from the spider, upon the angular part 234 engaging the fixed stop or roller 233 and drops back 15° to be engaged by the second post 231 also depending from said spider. This dropping-back operation is here caused to occur while the spider advances only 5°, so that the next drop back of the carriage 216 is 10°, that is, 5° less than the angle between the mid-radial planes of the magazines. The second pick-up, that is, by the post 231 thus occurs at 40° by the second post 231, then also at that angle, and is continued for 20°, that is, until the spider has traveled to 75°. The carriage 216, however, has traveled only to 60°, or through a net movement of 30°. The latch 225 is thereupon again released, this time by the second fixed lug or roller 235 and magazine carriage 216 allowed to return to the position of Figure 4, that is, dropped back through 30° ready for the next pick up in connection with the succeeding pair of heads on the spider 62.

Line 11 is a diagram showing this operation in a more graphic manner, that is, showing not only the spider movement graphically but the actual carriage movement graphically by the ordinates of the graph. From this, it will be seen that while the spider moves 20°, the carriage moves 20° forward therewith. However, during the next 5° of spider movement, the carriage travels back 10°. During the next 20° forward movement of the spider, the carriage moves with it, whereas during the final 15° movement forward in the spider cycle, the carriage travels back 30° to start a new cycle.

If the embodiment of lines 10 and 11 is employed, it is, of course, necessary to correspondingly change some of the other lines. For example, line 3 would be changed to end the first extension of the strip-stamp arm at about 35° rather than at about 33°. For a similar reason, line 5 would be changed to begin the extension of the wrap arm at 40° rather than at 42° and end at 60° as heretofore. Other changes, however, in the other lines would not be necessary as the change in the strip-stamp carriage pick-up and release occurs only in the first part of the operation of the strip-stamp and wrap-applying devices.

It is, of course, obvious that the spider 62 can be operated at a faster speed if only strip-stamps are applied, or if only wraps are applied, to the necks of bottles being processed by the machine. The operation of the carriage 216 when bottles are so processed is correspondingly simplified, the carriage holding only one magazine instead of two, and necessitating the use of only one set of posts 229 depending from the spider, rather than both sets of posts 229 and 231. In the same way, the fixed lug or roller 235 may be dispensed with, as there is only one pick-up and one release of the latch 225 during each cycle.

A chart of operations for such a carriage is represented in the line 12 of Figure 36. Referring to this line, it will be seen that the carriage 216 with only one of the magazines, that is, a wrap magazine or a strip-stamp magazine but not both, supported thereon, may be picked up as heretofore when the central radial plane of the carried magazine is at 30°, rather than at 15° as heretofore. In this embodiment, after being picked up at 30°, the carriage may move about 32° with the spider 62, whereupon the latch 225 disengages from one of the first and only kind of posts 229 depending from the spider. The angular part 234 in this case engages the only fixed stop or roller 233 and then drops back the full amount of forward movement, that is, about 32°, for the beginning of another cycle, while the spider moves forward to 90° where the succeeding post 229 thereon again engages the tongue 222 of the latch 225 and moves the carriage 216 forward to begin a new cycle, while indexed with a succeeding mechanism, 61 or 63, for a similar purpose.

If the embodiment of line 12 is employed, it is necessary to correspondingly change the operations represented by lines 1 and 5. Line 1 would be changed to apply the vacuum to the suction cups of the wrap device 63 if the carriage supported only a wrap magazine 224, at about 31° and end it at about 189°. Line 5 would be changed to extend the wrap arm at 30° or a little later and withdraw it at about 56° or a little later, the second extension at 180° and withdrawal at 240° being unchanged.

In the same way, if the carriage supported only a strip-stamp magazine 223, only the operations represented by lines 2 and 3 would be affected. Line 2 would be changed so that the vacuum would be applied thereto at about 30° and cut off at about 240°. Line 3 would likewise be changed to extend the strip-stamp arm at 30° or a little later and withdraw it at about 60°, the extension and withdrawal at 241° and 300°, respectively, being unchanged. The amount of possible speeding up can readily be determined by comparing the lengths of the first extensions discussed, as changes for lines 3 and 5, with those now on lines 3 and 5 of the chart, the discussed extensions being correspondingly longer. So it would thereby be possible to speed up the machine so that the time for picking up the wrap or stamp, as the case may be, corresponds with the time for picking up such in accordance with the first embodiment where the carriage 216 supports both magazines.

*Summary*

From the foregoing disclosure, it will be seen that a machine has been produced which may apply wrap and/or strip-stamps to bottles while en route, after said bottles have been label spotted and drawn from a conveyor. In one embodiment of the machine, the bottles are moved about the circumference of a circle three feet in diameter, the table on which they move being about three feet six inches in diameter. Other suggested dimensions may be approximately determined by scaling certain other views.

Referring to the assembly views, and particularly to Figures 1, 2 and 3, the machine may be started with a line of bottles on the chain conveyor leading thereto. Assuming that both strip-stamps and wraps are to be applied to the necks of such bottles, the operation is in accordance with lines 1 to 9, inclusive, or lines 10 and 11, with some of lines 1 to 8, inclusive, modified where necessary or desirable in accordance with the preceding discussion. So a strip-stamp may be withdrawn from its carriage while movably indexed between about 15° and about 33°, followed by the withdrawal of a wrap from its carriage while movably indexed between about 42° and about 60°. This strip-stamp and this wrap are then carried past a wrap heater 176 and a device for applying glue to the strip-stamp.

This heating and glue application operation occurs somewhere in the second quadrant, that is, between 75° and 165°, it being remembered that as we start the cycle at 15° in the first quadrant and each bottle is loaded at 180° after the start, this loading point is in the third quadrant. The wraps are assumed to be coated with heat-softening adhesive and so the heater may be simply an electric resistance device 176 disposed vertically and near to where the wraps will pass. This heater 176, represented in Figure 2, is positioned so that it is close to the adhesive-carrying surface of the wrap, which faces outwardly when the wrap head is in the position shown in the second quadrant in Figure 2. In other words, this heating may occur when the suction cups carrying the wrap are extended by their springs with the vacuum on, as at about 105° with reference to Figure 36. As an alternative, the adhesive on the wraps may be activated by a blast of hot fluid, such as hot air or steam, generally as disclosed in the Von Hofe Patent No. 2,613,007, dated October 7, 1952.

Adhesive may be applied to the strip-stamp carried by the strip-stamp device 61 at about the same position as by means of a wheel 177 rolling on a wheel 178 therebeneath which is immersed in a tank 179 containing suitable liquid adhesive. These wheels 178 and 179 are driven by a sprocket chain 180 passing over a wheel 184 which is carried by a shaft 230 driven in synchronism with the spider 62, as by being mechanically connected with the drive mechanism for the machine, shown in Figures 11 and 12, the details of this drive, however, being not disclosed as they are not, per se, part of the invention. The Johnson et al. Patent No. 1,238,713, dated August 28, 1917, and the Sloyer Patent No. 2,570,876, dated October 9, 1951, are referred to as showing other apparatus for applying adhesive. The first of these patents also discloses a conveyor and label magazines. If strip-stamps carrying adhesive are employed, it may be activated like that on the wraps, if of the same character.

After reaching 180°, the strip-stamp to which adhesive has been applied is juxtaposed with respect to a bottle as it reaches the end of the guide rail 44 and is turned on to the conveyor table of the machine, the wrap being advanced so as to be disposed adjacent thereto and still held by the application of vacuum to the suction cups 82 and 83. At about 184°, that is, about 4° after the loading of a bottle 39, the jaw 94 starts to close about the wrap to envelope the bottle neck therewith, followed by a closing of the jaw 95 and release of the vacuum on the suction cups at about 189°, to complete the envelopment of the bottle neck and sealing of the wrap thereto. At about 225° jaw 95 opens, followed by an opening of jaw 94 at about 230°.

If the embodiment of Figures 32 and 33 is employed, using wraps of Figures 34 and 35, then immediately after jaw 95 closes, the blade 117 is advanced by the application of compressed air to the cylinder 119 to bend down the part 124 of the wrap over the top of the bottle. This blade then withdraws, and the top or partly circular portion 124 of the wrap is, by the closing head 118, desirably carrying a rubber or other resilient pad 134, firmly secured to the top of the bottle by the downward operation of a piston in the cylinder 121 operated by compressed air. It will, of course, be understood that in accordance with the previous description, these cylinders 119 and 121 are supplied with compressed air through operation of the air commutator 54. This bending over and securing of the top portion of the wrap occurs immediately after the jaw 94 has opened, but before the wrap arm or applying hand 62 is withdrawn at about 240°, that is, between about 230° and 240°. If this embodiment is employed, it therefore may be found desirable to accelerate the opening of the jaw 94 so as to start the operation of the cylinders 119 and 121 a little earlier, so that they will conclude their work prior to the retraction of the strip-stamp arm at about 240°.

The wrap arm or applying hand 62 having been withdrawn at 240°, the strip-stamp device on the arm 61 is energized and the padding 150 on its boss 135 pushed down at about 241° or a little later to press the central portion of the strip-stamp on the top of the cork, or other closure. It is kept in such a position until about 300°. During that interval, the strip-stamp jaws 153 and 154 are swung down to bend the end portions of the strip-stamp 159 along the sides of the bottle neck, this operation starting at about 246° and concluding at about 300° when not only are the strip-stamp levers opened, but the strip-stamp device 61 is raised from the top of the bottle, the processing being then complete.

It will be understood that during this processing in the third and fourth quadrants, the bottles are held against sideways movement with respect to the carrying spiders by a closing of a bottle clamp 181 about each bottle at about 180° as represented by line 8 of Figure 36, said clamp not opening until after the processing is complete, that is, at about 312°. The bottle is discharged at about 315° or shortly thereafter, by engagement of an arm 49 of the star wheel 48 therewith, to carry it back to the conveyor belt 32.

Having now described the invention in detail in accordance with the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

What is claimed is:

1. A bottle wrap and government revenue strip-stamp-applying machine comprising a plurality of heads rotatable about a vertical axis, each head consisting of a vacuum picker and pneumatic hand for neck wraps and a vacuum picker and applier for government revenue strip-stamps, a carriage mounted to oscillate coaxially with respect to said heads, magazines fixed on said carriage and respectively carrying wraps coated with heat-softening adhesive and such strip-stamps, means movable with said heads to cause said carriage to travel therewith from an initial position while a wrap and a strip-stamp are being removed by said pickers from the magazines, means to return said carriage to initial position to be met by the next head for a repetition of the operation, means for heating each picker-carried wrap to condition the adhesive carried thereon for securing the wrap to a bottle, means for applying wet adhesive to each picker-carried strip-stamp, means for carrying filled, closed and labeled containers to said machine properly positioned for the application of wraps and strip-stamps, means for gripping each container as it reaches the machine to carry it with the heads thereof and hold it for wrap and strip-stamp application, a source of compressed air, means for producing a vacuum, and a timer valve for connecting and disconnecting said compressed air and vacuum-producing means, respectively, with respect to the pneumatic hands and strip-stamp appliers, and said pickers, so that each wrap picker may carry one wrap past the heating means, so that the adhesive thereon will be rendered tacky, and then the pneumatic hand may apply said wrap to the neck of a container, while each strip-stamp picker and applier carries one strip-stamp over the adhesive-applying means and, after the wrap application, applies said adhesive-carrying strip-stamp to the top portion of a container.

2. A bottle wrap and strip-stamp applying machine comprising a shaft mounted vertically for turning about its axis, a pair of spiders mounted one above another on said shaft to rotate about a vertical axis, means for continuously rotating said shaft, a plurality of heads carried by said spiders, each head consisting of a vacuum picker and wrap pneumatic hand and a vacuum picker and applier for government revenue strip-stamps, a carriage mounted to oscillate coaxially with respect to said heads, magazines respectively carrying wraps coated with heat-softening adhesive and such strip-stamps fixed on said carriage, means movable with said heads to cause said carriage to travel therewith from an initial position while a wrap and a strip-stamp are being removed from the magazines, means to return said carriage to initial position to be met by the next head for a repetition of the operation, means for heating each picker-carried wrap to condition the adhesive carried thereon for securing the wrap to a bottle, means for applying wet adhesive to each picker-carried strip-stamp, means disposed along said conveyor to orient each bottle carried thereby so that when it reaches the machine it will be properly positioned for the application of wraps and strip-stamps, pneumatic means for gripping each bottle as it reaches the machine to carry it with the heads thereof and hold it in position for wrap and strip-stamp application, a source of compressed air, means for producing a vacuum, and a valve for at suitable times connecting said compressed air and vacuum-producing means respectively to the pneumatic hands and strip-stamp appliers, and said pickers, so that each wrap picker may carry one wrap past the heating means so that the adhesive thereon will be rendered tacky, and then the pneumatic hand may apply said wrap to the neck of a bottle, while each strip-stamp picker and applier carries one strip-stamp over the glue-applying means and, after the wrap application, applies said glue carrying strip-stamp to a bottle top.

3. A bottle-wrap-applying machine comprising a plurality of heads carried for turning about a vertical axis, each head consisting of a vacuum picker and a pneumatic hand for bottle neck wraps, a carriage mounted to oscillate coaxially with respect to said shaft, a magazine carrying wraps coated with heat-softening adhesive fixed on said carriage, means movable with said heads to cause said carriage to travel therewith from an initial position while a wrap is being removed by a picker from the magazine, means to return said carriage to initial position to be met by the next picker for a repetition of the operation, a conveyor for carrying labeled bottles to said machine, properly positioned for the application of wraps, means for gripping each bottle as it reaches the machine to carry it with the heads thereof and hold it in position for wrap application, a source of compressed air, means for producing a vacuum, and a valve for at suitable times respectively connecting said compressed air and vacuum-producing means to the pneumatic hands and pickers, so that each picker carries one wrap past the heating means, the adhesive thereon is conditioned for adherence, and then the pneumatic hand applies said wrap to the neck of a bottle.

4. A bottle strip-stamp-applying machine comprising a plurality of heads carried for turning about a vertical axis, each head consisting of a vacuum picker and pneumatic strip-stamp applier, a carriage mounted to oscillate coaxially with respect to said shaft, a strip-stamp magazine fixed on said carriage, means movable with said heads to cause said carriage to travel therewith from an initial position while a strip-stamp is being removed by one picker from the magazine, means to return said carriage to initial position to be met by the next picker for a repetition of the operation, means for applying adhesive to each picker-carried strip-stamp, a conveyor for carrying closed and labeled bottles to said machine, properly positioned for the application of wraps and strip stamps, means for gripping each bottle as it reaches the machine to carry it with the heads thereof and hold it in position for strip-stamp application, a source of compressed air, means for producing a vacuum, and a valve for at suitable times respectively connecting said compressed air and vacuum-producing means to the strip-stamp appliers and pickers, so that each picker carries one strip-stamp over the adhesive-applying means and then the associated applier secures said adhesive-carrying strip-stamp to the bottle neck.

5. A wrap-applying machine comprising a frame including a table with a top for supporting bottles to be processed, a shaft mounted vertically therein for turning about its axis, a disc fixed on said shaft to rotate about the axis thereof, means for continuously rotating said shaft, a plurality of vacuum picker and associated pneumatic wrap-applying hands carried by said disc, a carriage mounted to oscillate coaxially with respect to said shaft, a magazine carrying heat-sensitizable adhesive-coated wraps mounted on said carriage, means movable with said disc to cause bottles to travel therewith part way around said table and said carriage to travel therewith from an initial position while a wrap is being removed from the magazine by one picker, means to return said carriage to initial position after said wrap has been removed, to be met by the next picker for a repetition of the operation, means for heating each picker-carried wrap to render tacky the adhesive carried thereon, a conveyor for carrying filled, closed and labeled bottles to said table, means disposed along said conveyor to orient each bottle carried thereby, so that when it reaches the table it will be properly positioned for the application of wraps, means for gripping each bottle as it reaches the table to carry it with the said hands and hold it in position for wrap application, a source of compressed air, means for producing a vacuum, a valve having an element moving with said shaft for at suitable times connecting said compressed air to the pneumatic hands and said vacuum producing means to the pickers, so that each picker carries one wrap past the heating means, so that the adhesive thereon is rendered tacky, and then the associated hand applies said wrap to the neck of a table-supported and gripped bottle.

6. A revenue-stamp-applying machine comprising a frame including a table for supporting bottles to be processed, a shaft mounted vertically therein for turning about its axis, a disc fixed on said shaft to rotate about the axis thereof, means for continuously rotating said shaft, a plurality of vacuum picker and pneumatic strip-stamp appliers carried by said disc, a carriage mounted to oscillate coaxially with respect to said shaft, a magazine carrying paper revenue stamps mounted on said carriage, means movable with said disc to cause said carriage to travel therewith from an initial position while a stamp is being removed by one picker from the magazine, means to return said carriage to initial position to be met by the next picker for a repetition of the operation, means for applying adhesive to each picker-carried stamp, a conveyor for carrying filled, closed and labeled bottles to said table, means disposed along said conveyor to orient each bottle carried thereby so that when it reaches the table it will be properly positioned for the application of stamps, means for gripping each bottle as it reaches the table to carry it with a picker and applier and hold it in position for stamp application, a source of compressed air, means for producing a vacuum, and a valve having an element moving with said shaft for at suitable times connecting said compressed air to the appliers and said vacuum-producing means to the pickers, so that each stamp picker and applier carries one stamp past the adhesive-applying means and thereafter presses said glue-carrying stamp over the bottle top and seals the end portions thereof to the sides of the neck of a table-supported and gripped bottle therebeneath.

7. A bottle wrap and strip-stamp applying machine comprising a shaft mounted vertically for turning about its axis, a pair of discs coaxially mounted one above another on said shaft, means for continuously rotating said shaft, a plurality of heads carried by each of said discs, each head on one disc consisting of a wrap picker and pneumatic hand wrap applier, each head on the other disc consisting of a strip-stamp picker and applier, a carriage mounted to oscillate coaxially with respect to said shaft, a magazine carrying wraps coated with heat-softening adhesive and a strip-stamp magazine fixed on said carriage, means movable with said heads to cause said carriage to travel therewith from an initial position while a wrap and a strip-stamp are being removed by the pickers of one head from the magazines, means to return said carriage to initial position to be met by the next heads for a repetition of the operation, means for heating each hand-carried wrap to render tacky the adhesive carried thereon, means for applying adhesive to each holder-carried strip-stamp, a conveyor for carrying labeled bottles to said machine, means disposed along said conveyor to orient each bottle carried thereby so that when it reaches the machine it will be properly positioned for the application of wraps and strip-stamps, pneumatic means for gripping each bottle as it reaches the machine to carry it with the heads thereof and hold it in position for wrap and strip-stamp application, a source of compressed air, means for producing a vacuum, and a valve for at suitable times respectively connecting said compressed air and vacuum-producing means to the pneumatic hands and strip-stamp appliers and said pickers, so that a picker carries one wrap past the heating means, the adhesive thereon is rendered tacky, and then a hand applies said wrap to the neck of a bottle, while a picker carries one strip-stamp over the glue-applying means and, after the wrap application, the applier places said glue-carrying strip-stamp over the bottle top.

8. In a bottle processing machine, a rotary turret including a drive shaft and a table for supporting bottles to be processed, means for feeding bottles to said table for such processing comprising a series of belts traveling over generally cylindrical shaft-carried pulleys, said series being connected together, so that all move as a unit, by means of chains passing over sprocket wheels mounted on corresponding ends of said pulley shafts, the intermediate section of said belt being offset from the vertical axis of the turret so as to clear said drive shaft, guide rails to prevent bottles from passing off the belt prior to reaching the table and corresponding guide rails along the outgoing section of said belt, a spacing device oscillatable back and forth in synchronism with the movement of the rotary turret to feed bottles thereto from said belt in properly spaced positions, and a star wheel with arms rotating and engaging the bottles as they reach the end of their travel on the table to move them to the outgoing section of the belt.

9. A combined vacuum picker and pneumatic wrap-applying device for holding a bottle-neck wrap while being conditioned for application to the neck of a bottle and then wrapping and sealing it around said neck, comprising a base plate adapted to be secured to a rotatable carrying spider, a head having a nearly semi-cylindrical but slightly semi-conical pocket formed to receive a correspondingly-shaped neck of a bottle around which a wrap is to be applied, a pair of bottle neck encircling jaws connected to said head by pivotal means so as to, when a bottle neck is in said pocket, complete the enclosure thereof by a wrap, piston-containing compressed air cylinders, said pistons having rods for moving said jaws to closed position, resilient means for returning said jaws to open position, spring-loaded suction cups mounted one above the other for moving in and out of said head pocket, suction tubes carried by said cups and guiding said tubes in said head, and resilient means normally holding said cups in extended position, means for connecting said tubes to a source of vacuum, the outer end of one of the jaw-operating rods fixedly carrying a block, means pivoting said block to its jaw, a block pivotally connected to the outer end of the other jaw-operating rod, means also pivoting said block to its jaw, said first-mentioned jaw being formed to close about a bottle neck ahead of the other jaw, a bail comprising an intermediate portion which extends from top to bottom of the second jaw and has portions at each end embracing said jaw and respectively pivoted to the top and bottom thereof, a lever firmly secured to the central part of said bail, and means urging said lever outwardly with respect to the carrying jaw whereby, when said jaw reaches closed position, the first-mentioned jaw having previously closed, the block is swung so that the end of the jaw-operating rod engages the outer end of and forces the lever against the action of its spring to exert the required force to firmly urge the side portion of a wrap on the side edge portion underlying it, thereby effecting a firm sealing therebetween.

10. A combined vacuum picker and pneumatic wrap-applying device for holding a bottle-neck wrap while being conditioned for application to the neck of a bottle and then wrapping and sealing it around said neck, comprising a base plate adapted to be secured to a rotatable carrying spider, a head having a nearly semi-cylindrical but slightly semi-conical pocket formed to receive a correspondingly-shaped neck of a bottle around which a wrap is to be applied, sheet rubber padding the wrap-engaging surfaces of the head, a pair of bottle neck encircling jaws connected to said head by pivotal means so as to, when a bottle neck is in said pocket, complete the enclosure thereof by a wrap, piston-containing compressed air cylinders, said pistons having rods for moving said jaws to closed position, resilient means for returning said jaws to open position, spring-loaded suction cups mounted one above the other for moving in and out of said head pocket, suction tubes carried by said cups and guiding said tubes in said head, and resilient means normally holding said cups in extended position, means for connecting said tubes to a source of vacuum, a blade reciprocable to and from a position where it overlies the neck-receiving portion of said head to bend thereover a portion of a wrap, a piston-containing cylinder, said piston having a rod for moving said closing head to press down on such a bent portion of a wrap to cause it to adhere to the top of a bottle, the outer end of one of the jaw-operating rods fixedly carrying a block, means pivoting said block to its jaw, a block pivotally connected to the outer end of the other jaw-operating rod, means also pivoting said block to its jaw, said first-mentioned jaw being formed to close about a bottle neck ahead of the other jaw, a bail comprising an intermediate portion which extends from top to bottom of the second jaw and has lugs at each end embracing said jaw and respectively pivoted to the top and bottom thereof, a lever firmly secured to the central part of said bail, means urging said lever outwardly with respect to the carrying jaw whereby, when said jaw reaches closed position, the first-mentioned jaw having previously closed, the block is swung so that the end of the jaw-operating rod engages the outer end of and forces the lever against the action of its spring to exert the required force to firmly urge the side edge portion of a wrap on the side edge portion underlying it, thereby effecting a firm sealing therebetween, and sheet rubber padding the jaw surfaces which are to engage the wrap to facilitate the firm sealing operation.

11. A strip-stamp holding and applying device comprising a base plate adapted to be secured to a rotating turret, a pair of guide rods slidably extending vertically therethrough, an upper abutment carried by said rods, a lower block also carried by said rods, resilient means for normally holding said block in its upper position, a piston in an operating cylinder having a rod secured to the block to move the latter down from the base plate when compressed air is introduced thereto, four short bars, two on each side of said block and depending therefrom, strip-stamp picking and applying levers pivotally mounted on the lower ends of said bars, said levers being hollow and provided with downwardly-opening ports, means for connecting the interiors thereof to a source of vacuum, thin rubber padding the strip-stamp engaging surface of each lever, rods extending from pistons movable in air cylinder for swinging said levers from horizontal to depending positions, means pivoting the upper ends of said cylinders to the upper abutment, means adjustably connecting the lower ends of said piston rods to said levers, and resilient means acting on said levers to hold them in normally horizontal position.

12. A carriage for use in connection with magazines for wraps and strip-stamps to be applied to the necks of bottles, comprising a generally sector-shaped plate pivoted adjacent its narrow end and carrying an upstanding flange at its outer end, wrap and strip-stamp magazines also carried adjacent its outer end and angularly spaced with respect to one another, a latch member on the top surface of the carriage, a pivot connecting said latch member to said carriage, a spring urging said latch member clockwise and acting between it and the flange of said carriage, means for preventing said latch member from undesired clockwise turning, a tongue extending inwardly from said latch for selective engagement and pick-up by one of a series of depending parts of an overlying head-carrying member, the free end portion of said latch being angularly disposed with respect to the part which carries the tongue, and fixed means for engagement by said angularly disposed portion for releasing said latch from a depending part at desired times, and means for returning said carriage to initial position after such release.

13. The invention as defined in claim 12, in which a portion of the latch depends below the top surface of the carriage, the means for preventing undesired clockwise turning is an edge portion of said carriage when engaged by said depending latch portion, in which said depending parts form two series, those of one series being at a distance from the pivot axis of the carriage different from those of the other, and there are two fixed means, one engageable by a top portion of the angularly-disposed latch portion and the other disposed at a different distance from the pivotal axis and engageable by a bottom portion of said angularly-disposed portion.

14. A carriage for use in connection with a magazine for strip-stamps to be applied to the necks of bottles, comprising a plate pivoted adjacent one end and carrying an upstanding flange at its other end, a strip-stamp magazine also carried adjacent its other end, a latch member on the top surface of the carriage, a pivot connecting said latch member to said carriage, a spring acting between said latch member and said flange for preventing said latch from undesired turning under the influence of said spring, a tongue extending inwardly of said latch for selective engagement and pick-up by one of a series of depending parts of an overlying head-carrying member, the free end portion of said latch having a surface angularly-disposed with respect to the part which carries the tongue, fixed means for engagement by said angularly-disposed surface for releasing said latch from one of said depending parts at desired times, and means for returning said carriage to initial position after such release.

15. A carriage for use in connection with a magazine for wraps to be applied to the necks of bottles, comprising a plate pivoted adjacent one end and carrying an upstanding flange at its outer end, a wrap magazine also carried adjacent its outer end, a latch member on the top surface of the carriage, a spring acting between said latch member and said flange, means for preventing said latch member from undesired turning under the influence of said spring, a tongue extending from said latch for selective engagement and pick-up by one of a series of depending parts of an overlying head-carrying member, the free end portion of said latch having a surface angularly disposed with respect to the part which carries the tongue, fixed means for engagement by said angularly disposed surface for releasing said latch from one of said depending parts at desired times, and means for returning said carriage to initial position after such release.

16. A wrap and strip-stamp applying machine having the following elements in combination, means for feeding containers to and supporting them on said machine, a series of wrap-picking, carrying and applying mechanisms, each operative to secure a wrap to a part of a supported container, adhesive-conditioning means for wraps so carried, a series of strip-stamp picking, carrying and applying mechanisms, each operative to secure a strip-stamp to a part of a supported container after the securing of a wrap thereto, adhesive-applying means for strip-stamps so carried, a magazine holding wraps having adhesive thereon and traveling with one of said wrap mechanisms while a wrap is being picked therefrom, a strip-stamp magazine traveling with one of said strip-stamp mechanisms while a strip-stamp is being picked therefrom, means to return said magazines to initial position after such picking for use by succeeding mechanisms, and means for effecting the operation of all of the aforesaid machine elements in properly-timed relationship.

17. A wrap applying machine having the following elements in combination, means for feeding containers to and supporting them on said machine, a series of wrap-picking, carrying and applying mechanisms, each operative to secure a wrap to a part of a supported container, a wrap magazine traveling with one of said mechanisms while a wrap is being picked therefrom, means to return said magazine to initial position after such picking for use by a succeeding mechanism, and means for effecting the operation of all of the aforesaid machine elements in properly-timed relationship.

18. A strip-stamp applying machine having the following elements in combination, means for feeding containers to and supporting them on said machine, a series of strip-stamp picking, carrying and applying mechanisms, each operative to secure a strip-stamp to a part of a supported container, a strip-stamp magazine traveling with one of said mechanisms while a strip-stamp is being picked therefrom, means to return said magazine to initial position after such picking for use by a succeeding mechanism, and means for effecting the operation of all of the aforesaid machine elements in properly-timed relationship.

19. A wrap and strip-stamp applying machine having the following elements in combination, means for feeding containers to and supporting them on said machine, means for transporting said containers through said machine in predetermined fixed relative positions, a series of wrap-picking carrying and applying mechanisms, each operative to secure a wrap to a part of a transported container, a series of strip-stamp picking, carrying and applying mechanisms, each operative to secure a strip-stamp to a part of a transported container, a magazine holding wraps and adapted to be in alignment with one of said wrap-picking, carrying and applying mechanisms while a wrap is being picked therefrom and then in alignment with succeeding of such wrap mechanisms while a similar operation is being performed, a strip-stamp magazine adapted to be in alignment with one of said strip-stamp picking, carrying and applying mechanisms while a strip-stamp is being picked therefrom and then in alignment with succeeding of such strip-stamp mechanisms while a similar operation is being performed, and means for effecting the operation of all of the aforesaid machine elements in properly-timed relationship.

20. The invention as defined in claim 19, wherein there are provided means for conditioning wraps, while carried by the wrap-picking, carrying and applying mechanisms, for adhering to said containers, and means for applying adhesive to strip-stamps while carried by the strip-stamp picking, carrying and applying mechanisms.

21. A wrap applying machine having the following elements in combination, means for feeding containers to and supporting them on said machine, means for transporting said containers through said machine in predetermined fixed relative positions, a series of wrap-picking, carrying and applying mechanisms, each operative to secure a wrap to a part of a transported container, a magazine holding wraps and adapted to be in alignment with one of said wrap-picking, carrying and applying mechanisms while a wrap is being picked therefrom and then in alignment with succeeding mechanisms while a similar operation is being performed, and means for effecting the operation of all of the aforesaid machine elements in properly-timed relationship.

22. The invention as defined in claim 21, wherein there is provided means for conditioning wraps, while carried by the wrap-picking, carrying and applying mechanisms, for adhering to said containers.

23. A strip-stamp applying machine having the following elements in combination, means for feeding containers to and supporting them on said machine, means for transporting said containers through said machine in predetermined fixed relative positions, a series of strip-stamp picking, carrying and applying mechanisms, each operative to secure a strip-stamp to a part of a transported container, a strip-stamp magazine adapted to be in alignment with one of said mechanisms while a strip-stamp is being picked therefrom and then in alignment with succeeding mechanisms while a similar operation is being performed, and means for effecting the operation of all of the aforesaid machine elements in properly-timed relationship.

24. The invention as defined in claim 23, wherein there is provided means for applying adhesive to strip-stamps while carried by the strip-stamp picking, carrying and applying mechanisms.

No references cited.